(12) United States Patent
Gill et al.

(10) Patent No.: US 11,501,081 B1
(45) Date of Patent: Nov. 15, 2022

(54) METHODS, MEDIUMS, AND SYSTEMS FOR PROVIDING A MODEL FOR AN END-USER DEVICE

(71) Applicant: META PLATFORMS, INC., Menlo Park, CA (US)

(72) Inventors: Prince Gill, Menlo Park, CA (US); Honglei Liu, Menlo Park, CA (US); Wenhai Yang, Menlo Park, CA (US); Kshitiz Malik, Menlo Park, CA (US); Nanshu Wang, Menlo Park, CA (US); David Reiss, Menlo Park, CA (US)

(73) Assignee: Meta Platforms, Inc., Menlo Park, CA (US)

(*) Notice: Subject to any disclaimer, the term of this patent is extended or adjusted under 35 U.S.C. 154(b) by 293 days.

(21) Appl. No.: 16/731,304

(22) Filed: Dec. 31, 2019

(51) Int. Cl.
| | | |
|---|---|---|
| *G06F 40/30* | (2020.01) | |
| *H04L 9/40* | (2022.01) | |
| *G06N 5/04* | (2006.01) | |
| *G06N 20/00* | (2019.01) | |
| *H04L 51/52* | (2022.01) | |

(52) U.S. Cl.
CPC ............... *G06F 40/30* (2020.01); *G06N 5/04* (2013.01); *G06N 20/00* (2019.01); *H04L 51/52* (2022.05); *H04L 63/0428* (2013.01)

(58) Field of Classification Search
CPC .......... G06N 5/04; G06N 20/00; G06F 40/30; H04L 51/32; H04L 63/0428; H04L 51/52; G10L 15/22
See application file for complete search history.

(56) References Cited

U.S. PATENT DOCUMENTS

| | | | |
|---|---|---|---|
| 7,167,817 B2 | 1/2007 | Mosterman et al. | |
| 10,015,194 B1* | 7/2018 | Grafi | G06F 21/566 |
| 11,101,043 B2 | 8/2021 | Krishnan et al. | |
| 11,151,106 B1* | 10/2021 | Kulikov | G06F 17/145 |
| 2005/0228790 A1* | 10/2005 | Ronnewinkel | G06F 16/35 |
| 2005/0278613 A1 | 12/2005 | Morinaga et al. | |
| 2008/0312904 A1 | 12/2008 | Balchandran et al. | |
| 2009/0306962 A1* | 12/2009 | Harlow | G06F 40/289 704/9 |
| 2010/0070908 A1* | 3/2010 | Mori | G06F 3/04886 715/764 |
| 2012/0303452 A1* | 11/2012 | Xue | H04L 51/02 705/14.49 |
| 2014/0184544 A1* | 7/2014 | Lim | H04L 51/066 345/173 |

(Continued)

OTHER PUBLICATIONS

Wang W., et al., "End-To-End Encrypted Traffic Classification with One-Dimensional Convolution Neural Networks," 2017 IEEE International Conference on Intelligence and Security Informatics (ISI), 2017, pp. 43-48.

*Primary Examiner* — Eric Yen
(74) *Attorney, Agent, or Firm* — Fenwick & West LLP

(57) ABSTRACT

Exemplary embodiments relate to methods, mediums, and systems for moving language models from a server to the client device. Such embodiments may be deployed in an environment where the server is not able to provide modeling services to the clients, such as an end-to-end encrypted (E2EE) environment. Several different techniques are described to address issues of size and complexity reduction, model architecture optimization, model training, battery power reduction, and latency reduction.

20 Claims, 12 Drawing Sheets

(56) References Cited

U.S. PATENT DOCUMENTS

| | | | |
|---|---|---|---|
| 2014/0237057 A1* | 8/2014 | Khodorenko | H04L 12/1831 709/206 |
| 2015/0170053 A1 | 6/2015 | Miao | |
| 2015/0178371 A1* | 6/2015 | Seth | G06Q 30/016 707/755 |
| 2016/0308794 A1* | 10/2016 | Kim | H04M 19/04 |
| 2017/0067325 A1 | 3/2017 | Garcia et al. | |
| 2017/0083829 A1 | 3/2017 | Kang et al. | |
| 2017/0132528 A1 | 5/2017 | Aslan et al. | |
| 2017/0161279 A1* | 6/2017 | Franceschini | G06N 5/02 |
| 2017/0161619 A1* | 6/2017 | Franceschini | G06N 5/022 |
| 2018/0137855 A1* | 5/2018 | Lee | G06F 40/232 |
| 2018/0336183 A1* | 11/2018 | Lee | G06N 3/08 |
| 2019/0007756 A1 | 1/2019 | Navali et al. | |
| 2019/0065486 A1* | 2/2019 | Lin | G06F 40/126 |
| 2019/0087689 A1 | 3/2019 | Chen | |
| 2019/0122141 A1 | 4/2019 | Zhen et al. | |
| 2019/0130285 A1* | 5/2019 | Snyder | G06Q 30/0631 |
| 2019/0244115 A1 | 8/2019 | Tang et al. | |
| 2019/0325308 A1 | 10/2019 | Chung et al. | |
| 2020/0034702 A1 | 1/2020 | Fukuda et al. | |
| 2020/0082226 A1 | 3/2020 | Shazeer et al. | |
| 2020/0104874 A1 | 4/2020 | Chintakindi et al. | |
| 2020/0120163 A1* | 4/2020 | Gargi | G06F 9/451 |
| 2020/0125893 A1 | 4/2020 | Choi et al. | |
| 2020/0201697 A1* | 6/2020 | Torng | G11C 29/52 |
| 2020/0356852 A1 | 11/2020 | Na et al. | |
| 2020/0357384 A1 | 11/2020 | Kim et al. | |
| 2020/0364617 A1 | 11/2020 | Luong et al. | |
| 2020/0380308 A1 | 12/2020 | Boedihardjo et al. | |
| 2021/0049443 A1* | 2/2021 | Klaiman | G06N 3/04 |
| 2021/0073624 A1 | 3/2021 | Yoo et al. | |
| 2021/0099307 A1* | 4/2021 | Rolf | G06F 7/58 |
| 2021/0134279 A1 | 5/2021 | Mallenahally | G06F 40/205 |
| 2021/0150606 A1* | 5/2021 | Xia | G06F 16/9532 |
| 2021/0182612 A1* | 6/2021 | Zeng | G06K 9/6256 |
| 2021/0235167 A1 | 7/2021 | Park et al. | |

* cited by examiner

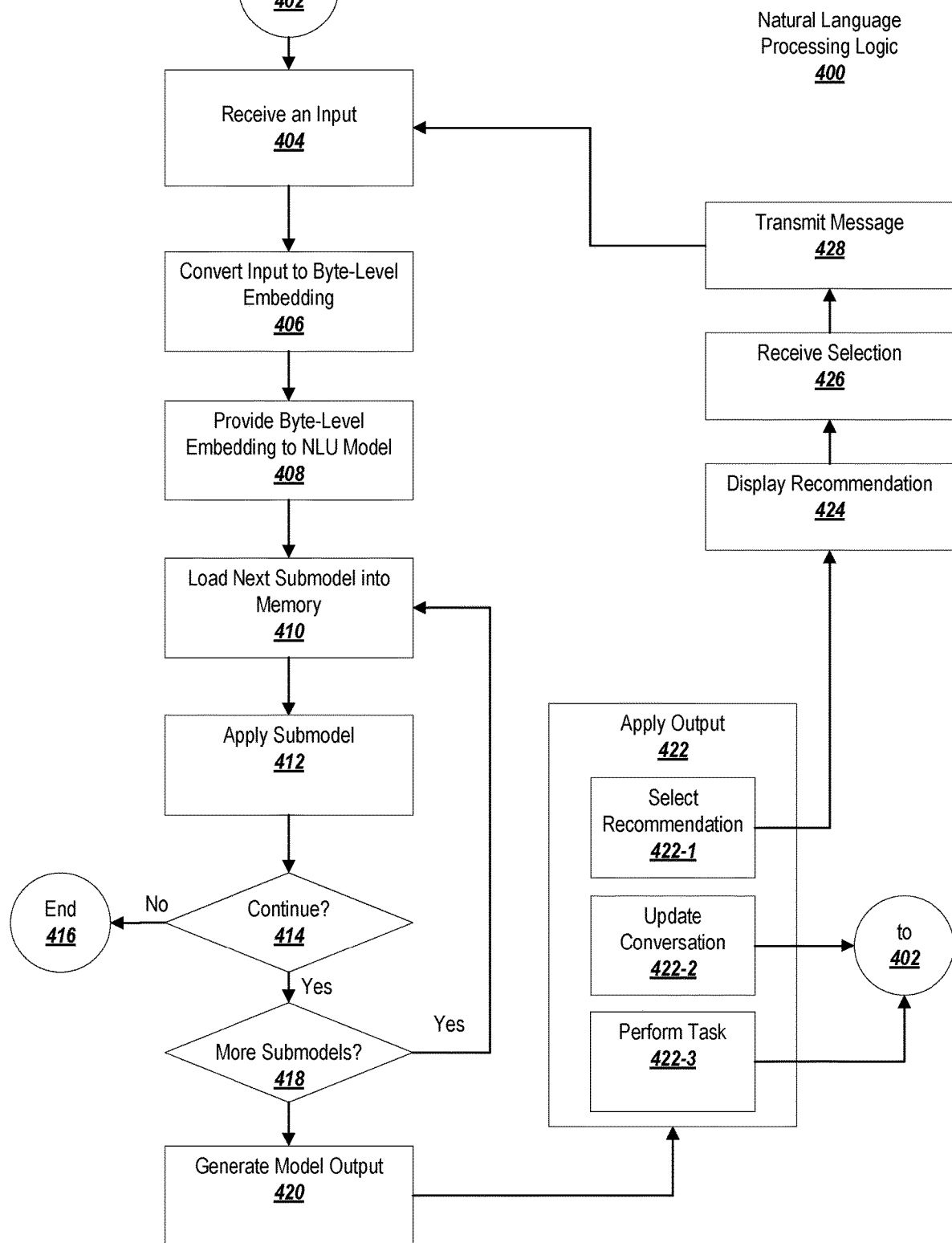

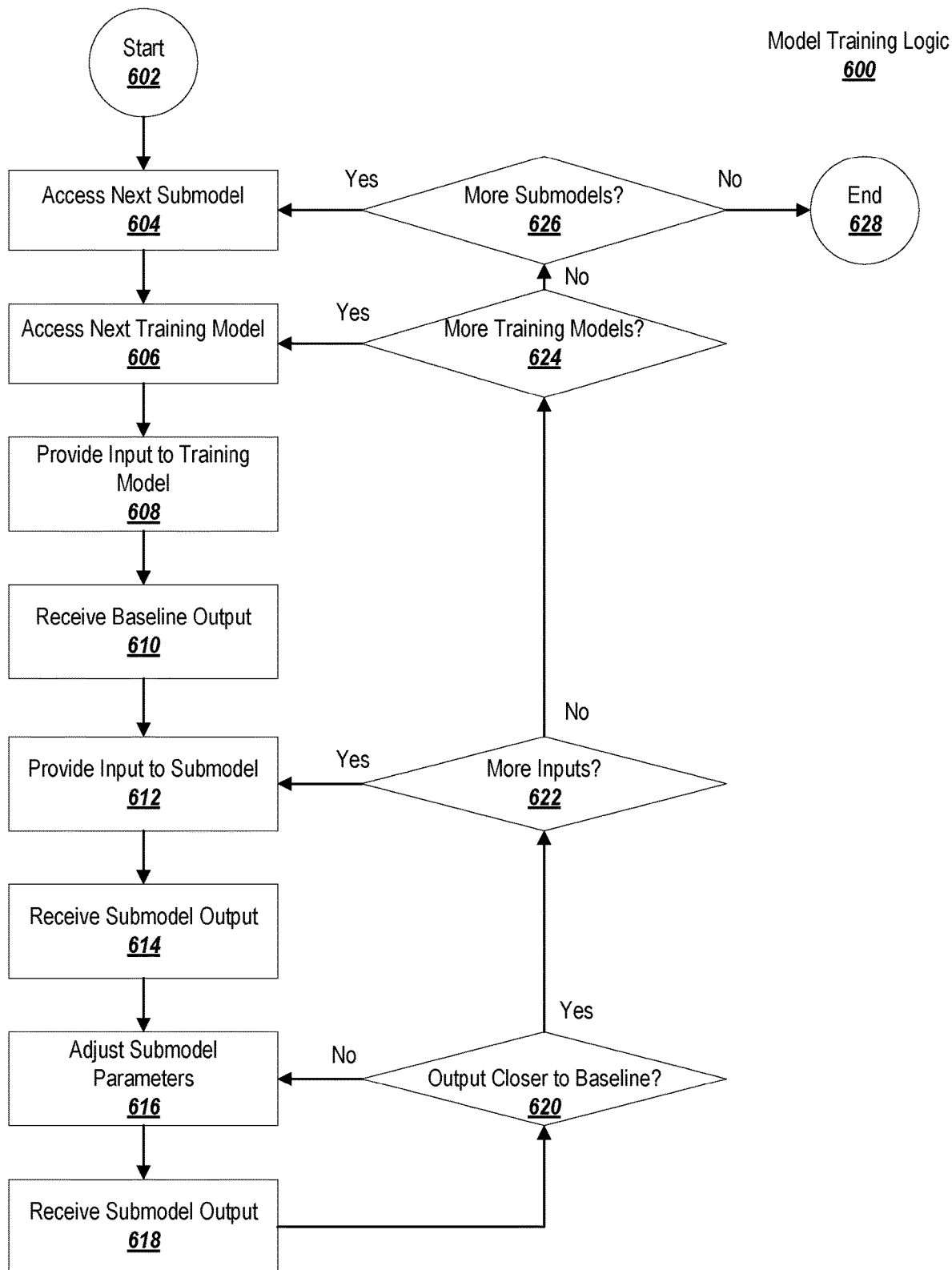

METHODS, MEDIUMS, AND SYSTEMS FOR PROVIDING A MODEL FOR AN END-USER DEVICE

BACKGROUND

Systems for supporting human-computer interaction are increasingly becoming more sophisticated. Whereas humans have traditionally been restricted to interacting with computers in highly structured ways, advances in machine learning are allowing computers to process input that is provided in a natural language. Processing natural language inputs, particularly when the input requests the computer to engage in conversation, perform a task, or make a recommendation, may be complex. Accordingly, natural language processing is often performed at a central server having significant processing, power, and memory resources (as compared to, for example, an end-user device such as a personal computer or mobile device).

BRIEF DESCRIPTION OF THE DRAWINGS

FIG. 4 is a flowchart describing an exemplary method for processing natural language with an on-device model.

FIG. 6 is a flowchart describing an exemplary method for training an on-device model.

DETAILED DESCRIPTION

Figure 1:
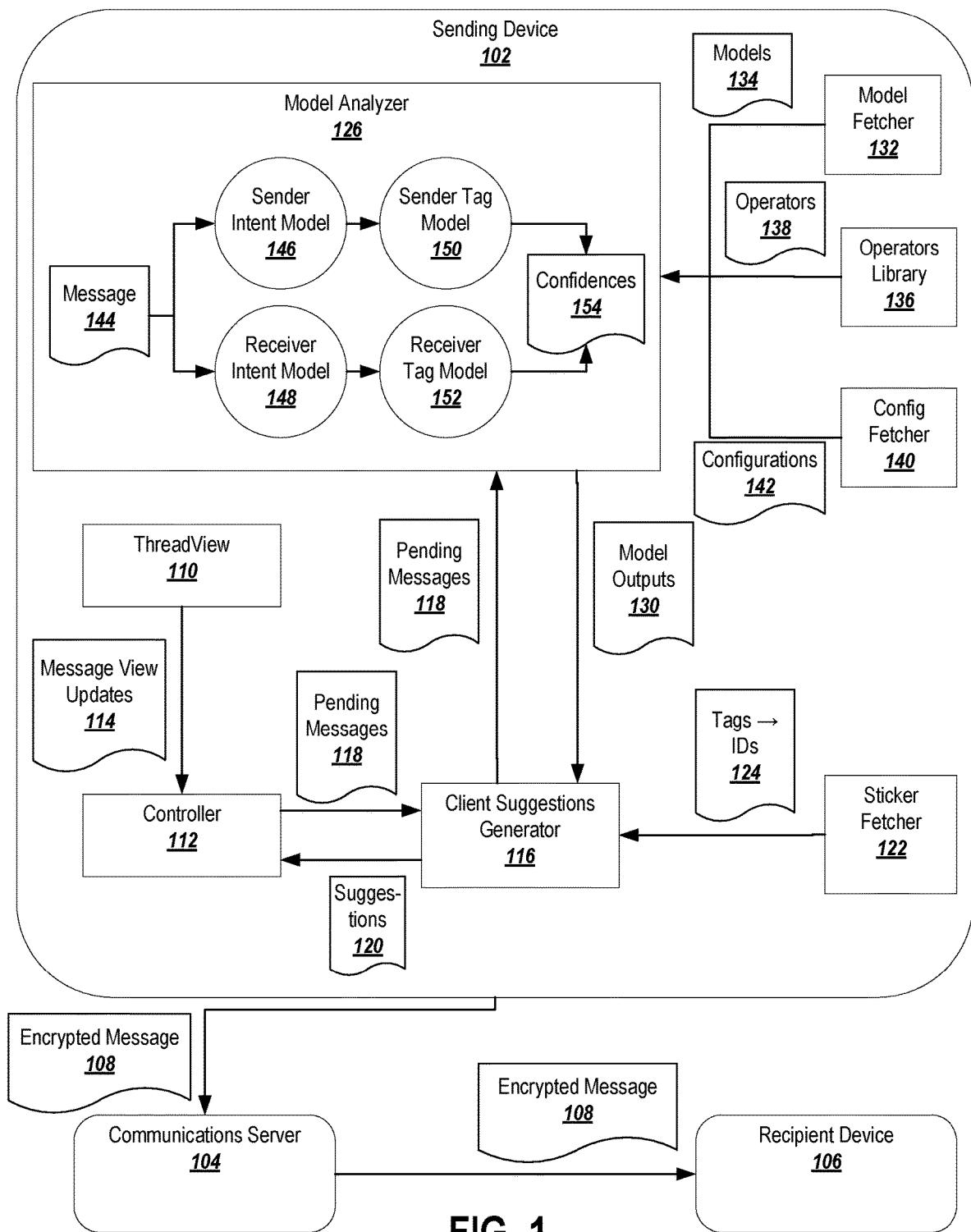
FIG. 1 depicts an overview of an exemplary natural language understanding architecture according to an embodiment.

While the conventional server-side implementation of machine learning models (and particularly natural language understanding models) works reasonably well in traditional environments, they are not well-suited to new implementations. For instance, exemplary embodiments involve applying such models in an end-to-end encrypted (E2EE) environment. When traditional models are introduced into an E2EE environment, several problems arise.

For example, natural language understanding models may operate on the natural language present in a message exchanged between two users of a communication system. However, when that communication system is E2EE, by definition the message content is visible only to the endpoints of the exchange (i.e., the client devices). Therefore, the intermediate server does not have access to the message content, and accordingly cannot apply machine learning models to the content for purposes of natural language processing, intent determination, making recommendations, etc.

Thus, if the models are to be applied to the message content, they may need to be relocated to the end-user devices. However, these devices tend to have significantly fewer processing, memory, and power resources compared to a server. This can result in a negative user experience. For example, having reduced processing resources may result in longer latency between when a user provides the natural language input and receives an output (the result of performing a task, a follow-up communication in a conversation, or a recommendation, among other possibilities). With reduced memory resources, larger models may not be supported, which means that model performance may suffer (if the model can be stored on the device at all) and the user may be provided with less accurate results. Moreover, the system may not be able to process large amounts of training data, so new training methods are needed to improve model performance. Battery usage, memory usage, latency, and available operators and libraries also become issues when the model is moved to the more limited client device. Exemplary embodiments provide several different techniques to address these issues.

With respect to the size and complexity of the model, the models tend to be large on the server side because of the way the inputs are represented as word embedding vectors. Given the large vocabulary needed to represent natural language, the embeddings themselves are very large. To accommodate the more limited storage space on a mobile device, exemplary embodiments represent the word embeddings at the byte level, instead of at the word level. Accordingly, for instance, the embedding space can be represented based on 256 bytes, rather than the tens-of-thousands to millions of words needed for a vocabulary-based embedding.

With respect to model architecture optimization, exemplary embodiments use a smaller library set available on a mobile device as compared to a server. Thus, the model may be rewritten to use mobile-friendly operators. Furthermore, the model inputs may be changed into mobile-friendly representations. For instance, whereas the server could process natural language inputs as strings, the more limited library set on a mobile device may not be capable of handling an input of this type. Accordingly, exemplary embodiments may convert the input to a sequence of integers and train the model to process integer inputs.

With respect to model training, exemplary embodiments train a small model using one or more larger models. The larger models may be applied as a baseline, and act as teachers whose output guides the training of the smaller model. When using multiple models as trainers, each larger model may be assigned a different task to teach to the smaller model (e.g., in the case of a recommendations engine, the tasks may include detecting when to trigger suggestions, when to trigger reminders, when to trigger calling agents, etc.)

With respect to battery power reduction, much of the problem of battery usage comes from the way the models are represented in memory. In the server setting, the entire model may be loaded into memory when initialized. In contrast, on the mobile side we define a "funnel" of sub-models that are run in a particular order. Exemplary embodiments select a model that screens out the most inputs first (for example, in a recommendations engine, a personalization model may be applied first, where the personalization model determines whether or not a user is likely to use suggestions from the engine in the first place). Only when an input passes through a given model screen does the system move on to the next model in the funnel, loading them into memory as appropriate. This may require that dependencies from the original server-based model be broken, so that the various sub-models can be run out-of-order.

With respect to latency reduction, some of the improvements discussed above may have the side effect of improving latency. For example, when the model code is rewritten to make use of available operators some that are not accessible from more limited device-level libraries may be eliminated. When making these changes, multiple operators may be reasonably suited to a given task, and exemplary embodiments may select from among the available operators with a preference for those that decrease latency. Thus, even if an operator is available on a mobile device, it might be excluded from use if a different operator exhibits better latency characteristics. Moreover, the present inventors have identified that latency is highly dependent on input size, and tends to scale quadratically. Thus, longer input text requires substantially more time to process than shorter input text. Accordingly, input size constraints can be implemented—in some embodiments, input size may be limited to around 200 characters or fewer.

Although described in connection with language models, aspects of this technology could be applied to any model (especially machine learning models) resident on a client device or another type of device with limited resources. Moreover, it is contemplated that the improvements summarized above (and described in more detail below) may be applied individually or in any combination. When applied in combination, certain improvements may have synergistic effects (e.g., the use of selected operators in conjunction with input size constraints may significantly improve latency, whereas reducing the size of the model in conjunction with applying the sub-model funnel may have the effects of improving memory usage while at the same time improving battery usage). Nonetheless, the described techniques may also be applied individually, if desired, in order to achieve the described advantages.

These and other features and advantages are described in the detailed block diagrams and flowcharts below. Before these exemplary embodiments are addressed, a general note on data privacy is provided.

Data Privacy

Some embodiments described herein make use of data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, some architectures in which exemplary embodiments may be deployed are described. These examples are provided for illustration purposes only, and it is understood that the embodiments described herein may be deployed in connection with any device-based model; they are particularly well-suited to machine-learning (ML) models (and especially natural language processing ML models), but may be deployed in other contexts as well.

Exemplary Recommendation Service

One type of architecture well-suited to exemplary embodiments is a recommendations service that receives input in a natural language and provides suggestions (e.g., automatically generated replies) that a user may wish to use, given the context in the input. FIG. 1 depicts an example architecture 100 in which a system analyzes messages having natural language content, and recommends graphical content (e.g., pictures, animated GIFs, emojis, stickers, etc.) that one user may wish to send to another user.

The system may use one or more models 146, 148, 150, 152 to make such a recommendation. The models 146, 148, 150, 152 may be machine-learning models, and at least some of them may perform natural language processing.

Typically, any such models 146, 148, 150, 152 would be resident on a server 104, where the models 146, 148, 150, 152 would have more access to processing and memory resources, and where power consumption as a result of the models 146, 148, 150, 152 would be relatively inconsequential. On the other hand, the embodiment depicted in FIG. 1 moves the models 146, 148, 150, 152 from the server 104 to the sending device 102 (similar models may be resident on the recipient device 106). This might be helpful or necessary if, for instance, the architecture 100 is deployed in an end-to-end-encrypted (E2EE) environment in which the communications server 104 is not able to see the content of encrypted messages 108 transmitted between the sending device 102 and the recipient device 106. Consequently, the architecture 100 may be modified so that the models 146, 148, 150, 152 can be efficiently deployed on the sending device 102.

The sending device 102 may employ one or more components or logic modules, which may be implemented in software and/or at least partially in hardware. They may be stored as instructions on a non-transitory computer-readable medium and may be executed by a processor configured to execute the instructions.

For example, the sending device 102 may be configured to display, as part of a messaging application running on a messaging service, one or more threads or conversations in which the user associated with the sending device is participating. When the user selects one of the threads to enter a thread view, a controller 112 may subscribe to receive updates to message items from a ThreadView component 110. The controller 112 may retrieve recent message view updates 114 (e.g., a predetermined number n of most-recent unread messages; in one embodiment, n=3), if any such message view updates 114 are available. While the user is in the thread view (and/or after the user exits the thread view), any future updates to the thread may be passed to the controller 112 to determine if they need to be analyzed.

The controller 112 may take the pending messages 118 from the ThreadView component 110 and pass them to a client suggestions generator 116. The generator 116 is responsible for passing the messages 118 to a model analyzer 126, and then accepting the output(s) 130 of the model analyzer 126. The generator 116 may convert the output(s) 130 to a list of suggestions to be shown by the controller 112.

In some embodiments, certain phrases in the pending messages 118 may always trigger a suggestion (such as "Happy Birthday!" or "Happy St. Paddys!"). To this end, the suggestions generator 116 may apply regex rules that are provided to it by the server 104. This may be helpful for ensuring that the sending device 102 always responds to certain cultural moments in the same way.

The suggestions generator 116 may be responsible for initializing the above-noted rules, the sticker fetcher 122, and the model analyzer 126. The suggestions generator 116 may hold the pending messages 118 until these components are ready to analyze them. If the initialization work is delayed for any reason, the controller 112 may compare available suggestions to recent messages to decide whether or not they should be shown to the user.

The sticker fetcher 122 is responsible for fetching the graphical content (e.g., images, animated GIFs, photographs, stickers, emojis, etc.) that will be used as the suggestions/recommendations. The sticker fetcher 122 may be personalized to the user of the sending device 102. For available graphical content, IDs of the content items may be fetched and mapped to supported tags that are outputted by the model analyzer 126. The graphical content IDs may be pre-ranked by the server 104 on a per-user basis, according to the user's previous usage of graphical content as well as global content usage. The sticker fetcher 122 may provide the suggestions generator 116 with a list of tags mapped to identifiers for graphical content items. The tags may be any classification output by the model analyzer 126, which may correspond to holidays (e.g., Independence Day, Valentine's Day, Birthdays), events (graduations, births, activities, etc.), emotions (e.g., happy, sad, laughing, sleepy, bored), contexts (e.g., weather, time-of-day) or any other classification based on the natural language included in the pending messages 118.

The model analyzer 126 may be initialized when the user first enters a thread in the messaging application. The model analyzer 126 may contact the model fetcher 132, which downloads models 134 relevant to the model analyzer 126 in the current context. For example, in the recommendation architecture 100, the model analyzer 126 may retrieve a sender intent model 146, a receiver intent model 148, a sender tag model 150, and a receiver tag model 152. The models may be downloaded from the communication server 104, a model-specific server, or some other location.

The models may make use of one or more operators or functions. In some cases, models originally built for a server environment may have been designed to use operators that are not available in the more limited libraries of mobile devices. The models 134 deployed on the sending device 102 may be rewritten to use mobile-friendly operators, and these operators may be specifically selected from among the available operators based on the increase or decrease in latency that will result from the user of the operator. For example, if two operators could conceivably be used, the one that results in the smallest latency increase (or the largest latency decrease) may be preferentially used. Consequently, the reduced processing resources of the sending device 102 as compared to the server 104 may be more efficiently used so that the suggestions can be provided to the user faster.

If the models 134 make use of operators that are not available natively in a local operators library 136, then the operators library 136 may fetch the required operators 138 from a remote source and provide the operators 138 to the model analyzer 126.

The models 134 may be accompanied by a configuration file, document, or metadata that defines how the models 134 operate and the outputs that they generate. For example, as described below the models may operate with respect to confidence thresholds that define whether or not a suggestion should be displayed. In some cases, it may be necessary or helpful to adjust these configurations as they iterate over inputs. The initial and/or modified configurations 142 may be provided to the model analyzer 126 by a config fetcher 140. Alternatively or in addition, the configurations 142 may be modified locally by the model analyzer 126.

The model analyzer accepts the model 134, the operators 138, the configurations 142, and the pending messages 118 and generates an output 130, which may include nothing (if no suggestions pass the requisite thresholds), one or more tags that are correlated to the natural language in the pending messages 118, and/or a predetermined number n of graphical content items selected based on the one or more tags.

To this end, the model analyzer 126 may select a message 144 from among the pending messages for analysis. If the message 144 is a message that was sent by the sending device 102, the message 144 may be provided to a sender intent model 146. If the message 144 is a message that was received by the sending device 102, the message 144 may be provided to the receiver intent model 148.

The sender intent model 146 is configured to determine whether the controller 112 will show one or more graphical content items as a suggestion in response to a message sent from the sending device 102 by the user. It may output a confidence (e.g., a value between 0 and 1) that indicates whether the sent message 144 should trigger the display of a suggestion. The sender intent model 146 may be trained based on the user's profile (e.g., age, gender, number of friends) and history of past interactions (e.g., whether the user has previously used suggested graphical content items, particularly with respect to sent messages), contextual information such as time-of-day, the relationship between the sender and the recipient of the message, social networking information, etc.

The receiver intent model 148 may be similar to the sender intent model 146, but operates on a message 144 received by the sending device 102. To that end, the receiver intent model 148 may be trained in a similar manner, but particularly with respect to received messages.

As noted above, the sender intent model 146 and the receiver intent model 148 output a confidence value representing a likelihood that the user will want to use any suggested graphical content item (e.g., whether the user is likely to use a particular graphical content item, but rather whether the user is amenable to using suggestions or recommendations in the first place). If the confidence is less than a predetermined threshold value (e.g., as provided in the configurations 142), then the model analyzer may determine that no suggestion should be made, and the output 130 may indicate a null value. The predetermined threshold confidence for the sender intent model 146 and the receiver intent model 148 may be the same, or may be different.

If the output confidence exceeds the threshold, then processing may proceed to the sender tag model 150 or receiver tag model 152, as appropriate. The sender tag model 150 may analyze the natural language of the message 144, and output a predetermined number n of confidences 154 (e.g., between 0 and 1), each corresponding to a tag for graphical content items. The tags may then be mapped to particular graphical content item identifiers by the mapping 124 output by the sticker fetcher 122. The sender tag model 150 may be trained on training data including sent messages.

The receiver tag model 152 may perform similarly to the sender tag model 150, but may be trained on training data including received messages.

In some embodiments, the sender tag model 150 is configured to output fewer confidence scores 154/tag correlations than the receiver tag model 152 (e.g., in one embodiment, the receiver tag model 150 outputs 32 confidence scores 154, whereas the sender tag model 152 outputs 18 tag confidences). In some embodiments, the receiver tag model 152 outputs confidences 154 for each available tag that can be output by the model analyzer 126, whereas the sender tag model 150 only outputs confidences 154 with respect to a subset of the tags (or the sender tag model 150 and receiver tag model 152 may output confidences 154 with respect to different subsets of tags). This may be done because certain recommendations that may make sense in response to receiving a message that do not make sense in response to sending a message (for example, one would not typically reply to their own message with "congratulations [to me]!" or "happy birthday [to me]!").

The tag models 150, 152 may be accompanied by respective lists (e.g., in text files) that contain the tags to be analyzed by the tag models 150, 152. The lists may be ordered in the same way as the outputted confidences of the models 150, 152. Consequently, the tags list and the models 150, 152 can both be edited together when the model fetcher 132 makes changes to the models 150, 152.

Each of the models 134 may be personalized to a given user, and may be trained based on the user's messages and past usage of graphical content items (subject to the privacy requirements noted above).

In some embodiments, the tag models 150, 152 may only be run if the intent models 146, 148 output a confidence greater than the threshold defined by the configuration fetcher 140.

If the tag with the greatest confidence among the confidences 154 output by the tag models 150, 152 exceeds a threshold defined in the configurations 142, the greatest-confidence tag may be used to select a predetermined number n (in one embodiment, n=5) of graphical content items from a larger set that may be pre-fetched by the sticker fetcher 122. The suggestions generator 116 may then take this information and convert it to suggestions 120 to be displayed by the controller 112.

In some cases, the number of graphical content items associated with any one given tag may exceed the predetermined number n. For instance, in one tested implementation, the communications service may support about 3500 predefined graphical content items. Selecting graphical content items with a particular tag may narrow down this list, but not to the predetermined number n. To this end, the pre-fetched item set may be personalized to the local user and ranked in order of preference for the local user.

The ranking may be done based on a number of features, such as the number of graphical content items sent by the user, the total messages sent by the user, the number of times the user sent each graphical content item, etc. This may be done at the server 104, or by the sticker fetcher 122. Even in embodiments in an E2EE environment, the server 104 may be capable of performing this task because no message content is required. The sending device 102 may cache these ranks on a regular basis (e.g., once per day). According to some embodiments, only the IDs of the graphical content items are fetched; assets corresponding to the graphical content items may be loaded at the time of rendering. On the other hand, users of E2EE encrypted networks may prefer not to share any information with the communications server 104, including the identity of graphical content items used in the users' messages. In such a case, the ranking may be done entirely on the local device.

The tactic of retrieving cached model information from the server 104 can also be used for the filtering models (e.g., the sender intent model 146 and the receiver intent model 148). For instance, the coefficients for the models 146, 148 may be selected by the server 104 and cached to the sending device 102 on a regular basis (e.g., once per day).

As an alternative or in addition to the depicted models 146, 148, 150, 152, other implementations may use other models. Examples of such models are described in more detail in connection with FIG. 3A.

Exemplary Task Completion Service

The techniques described herein are not limited to a recommendation service such as the one depicted in FIG. 1. Rather, these techniques may be applied to any system employing natural language models, and many of them may be applied to any system employing a machine learning model on an end-user device.

Figure 2A:
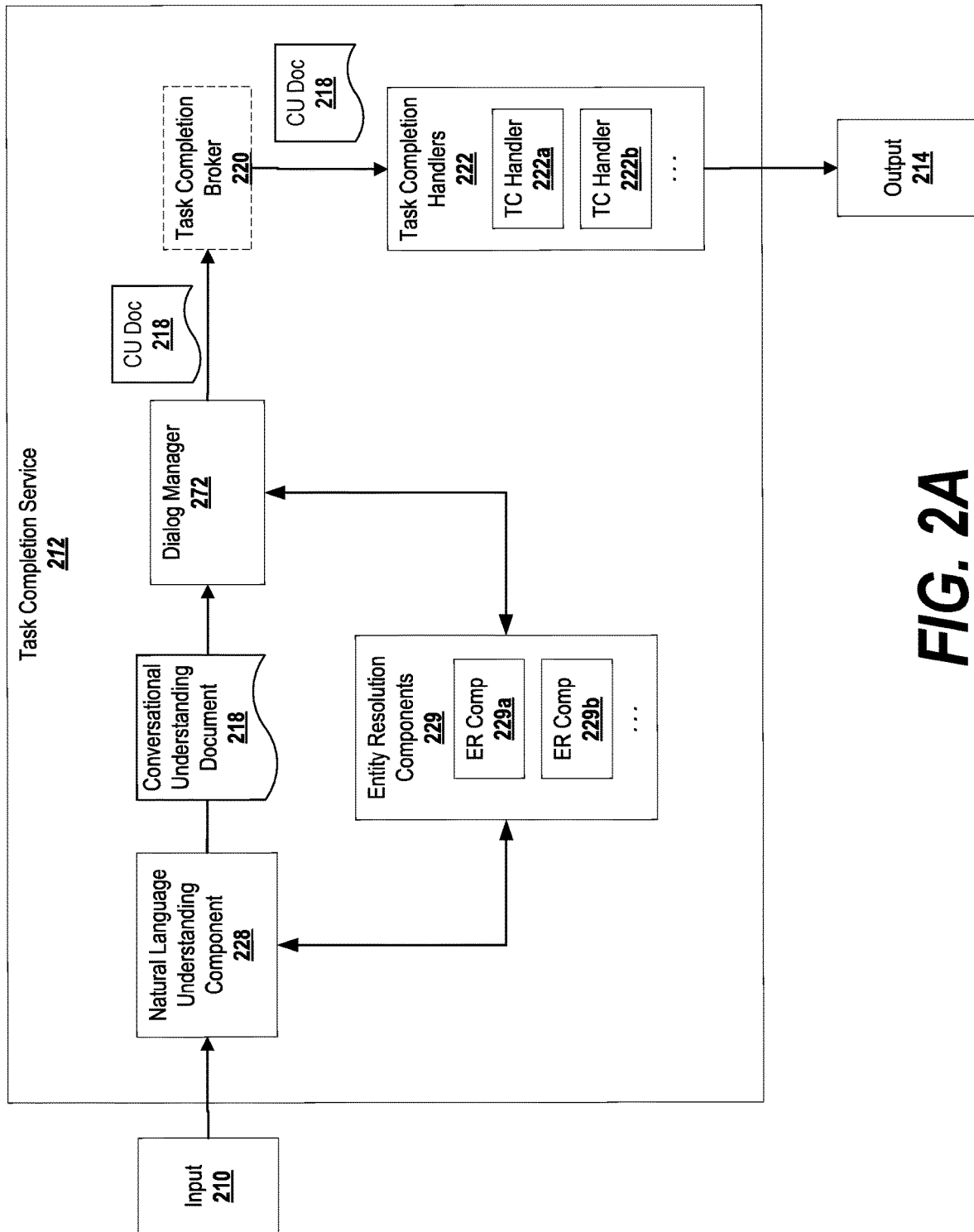
FIGS. 2A-2C depict an overview of an alternative natural language understanding architecture according to another embodiment.

By way of illustration, another natural language task is task completion, where natural language is processed in order for a software and/or hardware module to perform a task. FIG. 2A shows an overview of an exemplary task completion service 212 that may be resident on a client or end-user device. An input 210 including, for example, text in a natural language is provided to the task completion service 212. The input 210 may include a question, a request to perform a task, and/or information used to answer the question or perform the task. For example, the input 210 may include a query such as "when does the new Superman movie play?" or a request such as "purchase tickets for the new Superman movie?"

In the above examples, some information has been provided for answering the question or performing the task (e.g., that the movie is new and involves Superman), but the provided information may be insufficient to fully answer the question or perform the task. For instance, the task completion service 212 may need to know where the user wishes to see the movie, and at about what time. Accordingly, the task completion service 212 may guide a conversation to retrieve supplemental information, preferably in a natural conversational style.

An output 214 may be provided in a natural language (e.g., a language that has developed naturally in use, as contrasted with structured computer language). The output 214 may include an answer to the question (e.g., "Superman plays at 7:00 at the cinema down the street from you"), confirmation that the task has been performed (e.g., "I bought you tickets. Here's your receipt!") or a next iteration in the conversation (e.g., "Where would you like to see the movie?").

In order to generate the output 214, the input 210 may be provided to a natural language understanding component 228, which classifies the input 210 based on an intent of the input 210. In the above example, the natural language understanding component 228 might classify the input 210 as a request for movie times or a request to perform the task of purchasing movie tickets.

The natural language understanding component 228 may generate a conversational understanding (CU) document 218, which represents structured data that can be processed by a task completion handler 222 that services the input 210. The CU document 218 may include an identification of the intent of the input 210, any information that is known about the input 210, missing information that may be useful to address the input 210, etc.

Optionally, the CU document 218 may be provided to a broker 220. In cases where more than one task completion handler 222 exists for servicing the input 210, the broker may select one of the possible task completion handlers 222 to generate the output 214. For example, multiple movie service plugins may exist, and the broker 220 may select one of the movie service plugins to answer the question or purchase the tickets.

The task completion handler 222 identifies any missing information from the CU document 218, and guides a conversation in a natural language to obtain the missing information. When sufficient information has been collected to service the request or answer the question, the task completion handler 222 may provide an answer or fulfill the request.

Classification of the intent of the input and identification of present and missing information may be handled by the dialog manager 272. The dialog manager 272 may also maintain a conversational state of a conversation managed by the task completion handler 222 (for example, the dialog manager 272 may store any already-captured information about the input 210, and may update the CU document 18 with all available information). Meanwhile, selection of which missing information to pursue, the order to pursue the missing information, guidance of the conversation, and final servicing of the request may be handled by the task completion handler 222. Thus, separation is maintained between the capabilities of the dialog manager 272 and the task completion handler 222.

As a result, different plugins may be employed as part of the task completion handler 222, including third-party plugins. Moreover, the dialog manager 272 may be extended using third-party intent resolution handlers. This allows new intents to be serviced without rebuilding the entire task completion service 212 and allows different vendors to handle the same input 210 in different ways (e.g., using different conversational styles or different services).

Furthermore, this exemplary setup allows decisions about which information to pursue to be delayed to as late as possible in the processing flow (e.g., being handled by the task completion handler 222 instead of the dialog manager 272), which means that the task completion handler 222 may be able to infer some information or determine that some information identified by the dialog manager 272 is not relevant in the present context. For instance, in the above example, the task completion handler 222 may include a plugin provided by a movie application that only services theaters in a limited geographic area. If the movie Superman is only playing at one theater serviced by the plugin, then it may not be necessary for the task completion handler 222 to ask where the user would like to see the movie, and the handler 222 may refrain from asking the user questions related to location. This may not be possible in a system in which the decision as to which information to pursue is handled by a general-purpose dialog manager 272.

Figure 2B:
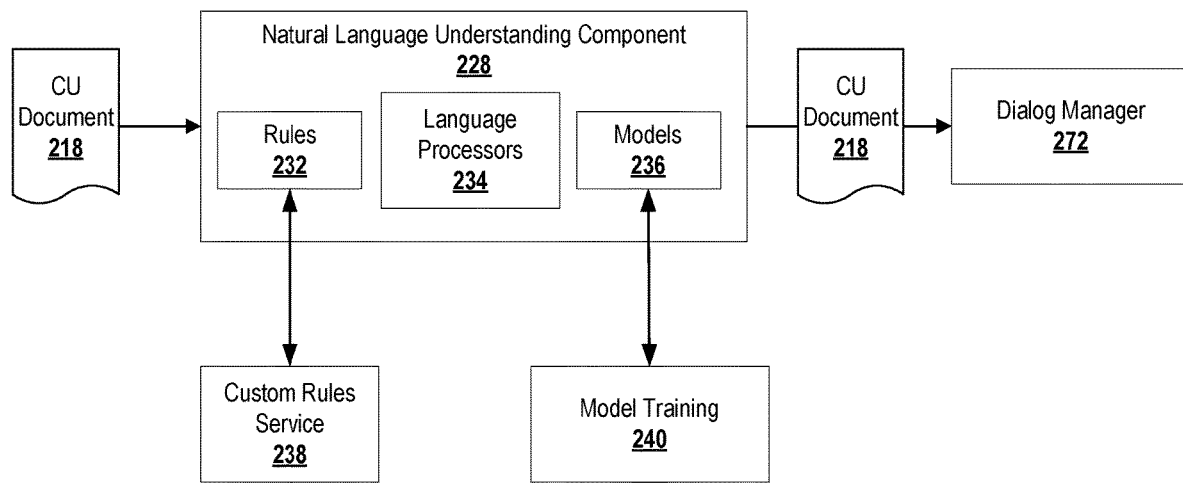

FIG. 2B illustrates an exemplary illustration of a natural language understanding (NLU) component 228, which works with the exemplary dialog manager 272 to determine the intent of the input 210, maintain a conversational state, and generate a CU document 218 to be provided to the broker 220 and/or the task completion handler 222. The NLU component 228 and dialog manager 272 may consult one or more entity resolution components 229 to resolve any entities in the input 210.

The goal of the NLU 228 and dialog manager 272 is to analyze the input 210 and fill in as many informational gaps as possible, given the information available to the respective components.

Initially, the NLU component 228 generates a CU document 218 with a unique identifier. The document contains all the information for the incoming request known to the NLU component 228. For example, the CU document 218 may include a partner ID identifying where the input 210 originated (e.g., an application or service), a viewer context, natural language text that was provided as part of the input 210, an ID for the language of the natural language text, etc. The CU document 218 is passed through the natural language understanding (NLU) component 228 and to the dialog manager 272.

FIG. 2B illustrates an exemplary NLU component 228 hosting custom rules 232, language processors 234, and trained models 236 which are composed into flows to meet the requirements of various partners. The NLU component 228 produces intent candidates (e.g., possible categories or classifications of tasks/questions) and/or a structured representation of the input natural language text which will be further processed by the intent service 216.

Next, a dialog manager 272 processes the output of the language processing steps performed by the natural language understanding component 228 and decides on next steps, such as further target information that is needed or useful to service the request or answer the question in the input 210. A description of suggested next steps, such as information to be requested, may be recorded in the CU document 218 that may be returned to the original caller or provided to a task completion handler 222. This information may be used to guide a back-and-forth conversation in which further information is solicited from a user.

The dialog manager 272 may have access to instances of the CU document 226 from previous interactions. For example, in an embodiment implemented in a social networking context, each such CU document 226 may be stored in a user's social networking graph. This way, the dialog manager 272 might use that earlier information to reconstruct a conversation and aggregate available information about a request or question.

Alternatively, or in addition, other ways of establishing a conversational context may also be used (e.g. retrieving a conversation history in a messaging program or other applications or interfaces for conducting a conversation).

The natural language understanding component 228 is now described in more detail.

Figure 2C:
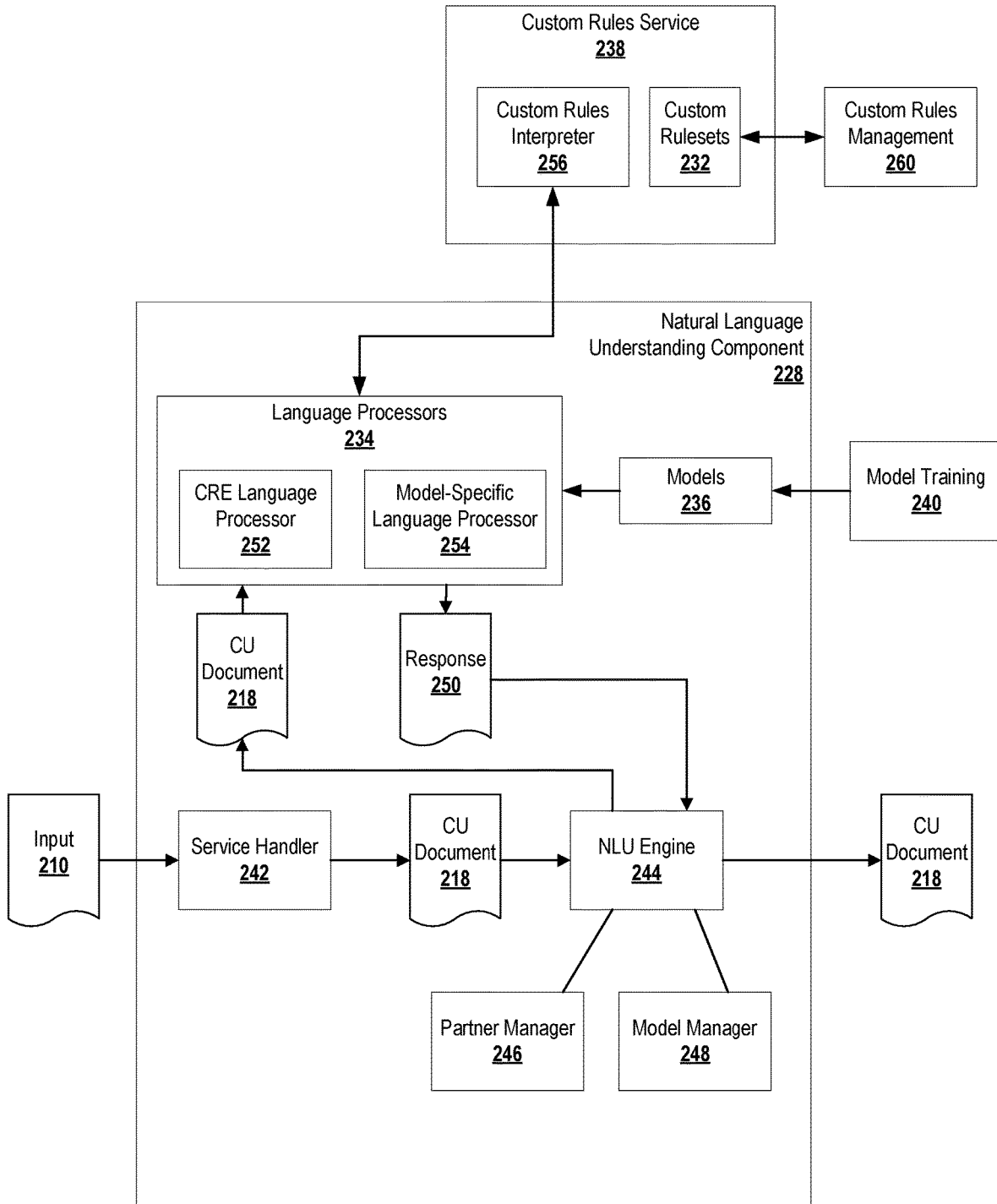

FIG. 2C depicts the natural language understanding (NLU) component 228 in more detail. The NLU component 228 is responsible for processing some input text (considering some context). It produces intent candidates and/or structured representation of the input text which will be further processed by the intent service 216.

As previously noted, the NLU component 228 may include custom rules 232 for one or more domains, which may be created through a custom rules engine (CRE) service 238. Given a specified partner ID, as discussed above, the CRE service 238 may evaluate the input against a custom rules set for that particular partner.

The NLU component 228 may also host machine-language-trained models 234 for language processing. The models 234 may be trained by one or more model trainers 240. The CRE service 238 and the models 234 may be composed together to form language processors 234 that implement partner-specific language processing flows.

The initial input 210 may be received by a service handler 242, which generates a CU document 218 and hands the CU document 218 off to an NLU Engine 244. Based on consultation with the language processors 234, a partner manager 246, and a model manager 248, the engine 244 creates an updated context document 218 (which may include the original input document 210).

Using the Partner Manager (PM) component 246, a Language Processor (LP) 234 is chosen to address the request. The Partner Manager 246 maintains a map between third-party partners and their specific implementation of a Language Processor 234 interface. Furthermore, a Model Manager (MM) 248 is passed, if necessary, to the partner-specific LP 234 so that information about all the deployed models 236 is available. The partner-specific LP 234 can utilize other processors 234 that are available in order to implement the processing on the context (e.g. SVM, CRF, Travel-specific SVM). The response of each Language Processor 234 may be added to the CU document 218 to generate a response 250, which is then converted into an updated CU document 218 by the NLU engine 244.

The language processors 234 may include a CRE language processor 252 and/or model-specific language processors 254, that are trained by the model trainer 240. There may also be a Language Processor 234 that acts as a bridge between the NLU service 228 and a predictor service for Deep Neural Network (DNN)-trained models.

Upon startup of the service, the Model Manager 248 indexes all the metadata about the models 236 that are available. Similarly, the Partner Manager 246 loads all the partner-specific Language Processors 234, which in turn instantiate all the Language Processors 234 they are using so that the models 236 are loaded in memory.

A new partner on-boarding may require the implementation of a new partner-specific LP 234 and a new deployment of the service 212. To avoid this coupling, a declarative mechanism may be provided for defining partner-specific compositions of our Language Processors 234. Such compositions may be loaded dynamically, without requiring a new deployment of the service 212.

As noted above, the language processors 234 may make use of custom rulesets 232, which may be accessed through a custom rules service 238. The custom rules service 238 may include a custom rules interpreter 258 for accepting an input from the language processors 234 and applying the custom rulesets 232. A custom rules management component 260 may provide an interface to allow new custom rulesets 232 to be easily defined and/or updated.

Alternatively, or in addition, in the absence of an appropriate ML-trained model 236, custom rules 232 may be used to process the input text and generate an intent. The custom rules 232 may also generate a candidate response for the response document 250.

Submodel Funnel

Exemplary embodiments provide a funnel of submodels that are loaded into memory one-by-one. This funneling technique is employed, among other reasons, to reduce battery power usage on a mobile device.

Conventionally, a model may be considered a monolithic whole with several different aspects that are interdependent. In the example of a recommendation architecture (see FIG. 1), one part of the model may analyze input text to determine if a user is likely to use recommendations, while another part of the model may select a particular recommendation to be sent to the user. Because some of the natural language processing in these different model parts may overlap, they may rely on interconnected code and hence are dependent on one another. Therefore, the entire model may be loaded into memory at one time so that one part of the model can leverage the calculations performed by another part of the model.

When the entire model is loaded into memory many reads and writes must be performed, which consumes battery power. However, many NLP tasks perform a filtering process whereby some parts of the model may not be needed. For example, in the recommendation architecture discussed above, the sender/receiver intent models 146, 148 may output a relatively low confidence which means that the user is unlikely to use a recommendation, even if one is applied. Accordingly, processing need not proceed to the sender/receiver tag models 150. If all the model parts are loaded into memory at once, the reads/writes used to set up and configure the sender/receiver tag models 150, 152 are therefore wasted and battery power is unnecessarily consumed. This is not generally an issue with a server-side implementation since the server has access to a great deal of power. On the other hand, moving the models to the end-user-device-side requires that the device use up its limited store of battery power.

Figure 3A:
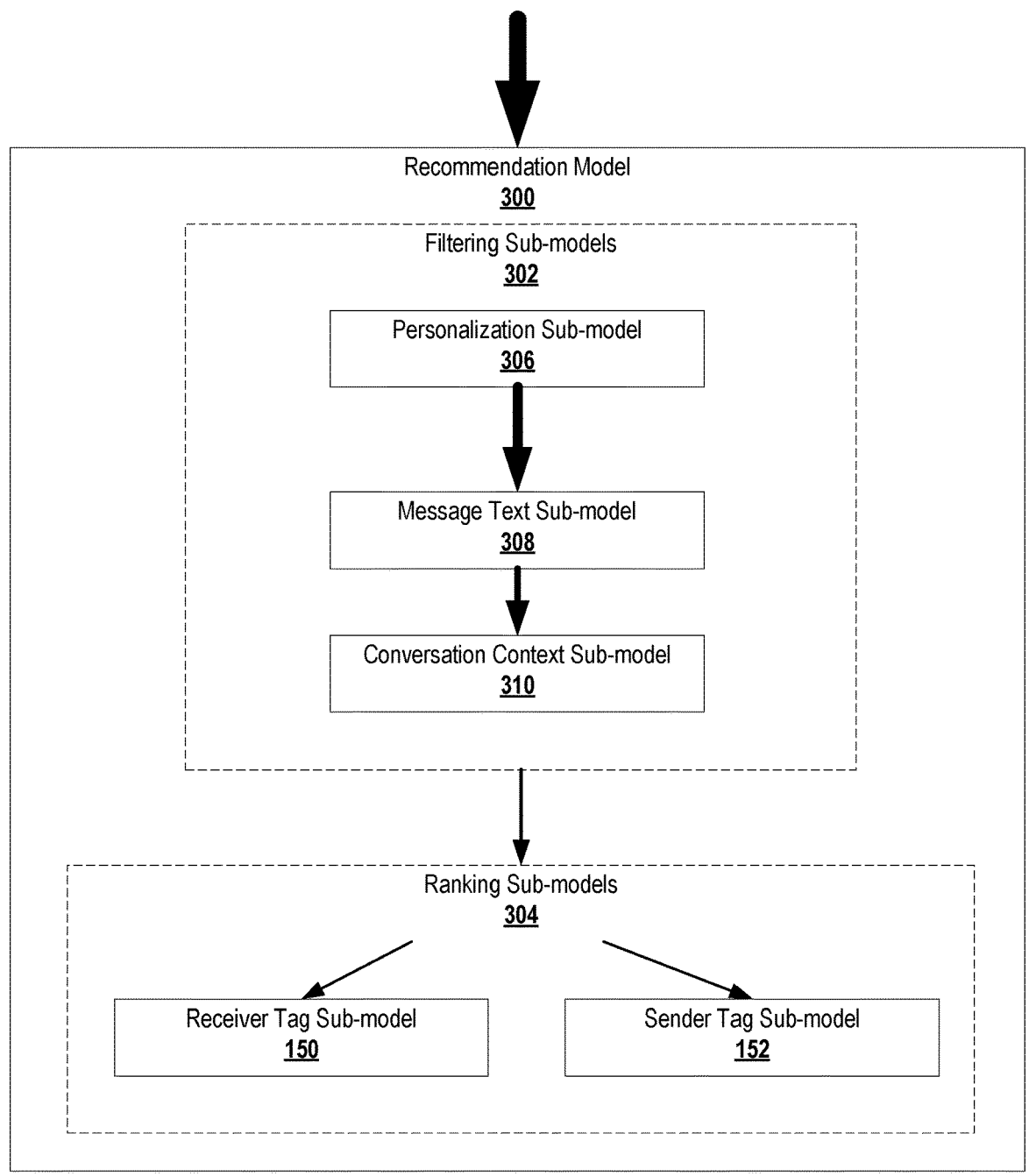
FIGS. 3A-3D are block diagrams depicting an exemplary model broken up into multiple sub-models and loaded into memory.

In exemplary embodiments, the model is broken up onto a set of sub-models that perform different actions. Most helpfully, some or all of the submodels may serve as gating mechanisms (e.g., processing does not proceed to a second submodel if the output of a first submodel indicates that further processing is not necessary). For instance, FIG. 3A shows a recommendation model 300 that is broken up into multiple submodels. The submodels form two groups: filtering submodels 302 that determine if a recommendation should be triggered, and ranking submodels 304 that determine which recommendation should be selected.

Each submodel may be loaded into memory one-at-a-time. Accordingly, before loading a new submodel into memory, the old submodel may be removed. The submodels may be loaded into memory in an order defined by how likely the submodel is to screen out options or render further processing unnecessary. Thus, the submodel that screens out the most potential options may be loaded first, and only if this submodel indicates that further processing is required should the submodel that screens out the second-most potential options be loaded (and so on). In some embodiments, the number of options screened out may be weighed against the memory usage of the submodel. Thus, even if a submodel may not screen out a large number of options, it may have a significantly smaller memory footprint than other submodels and might therefore be run first.

For example, in FIG. 3A, the filtering submodels 302 may indicate that a user is unlikely to use a recommendation if one is provided. Accordingly, the filtering submodels 302 may be run before the ranking submodels 304, because a negative output from the filtering submodels 302 may mean that the ranking submodels 304 do not need to be run. Therefore, the filtering submodels 302 may be loaded before the ranking sub-models 304.

Of the filtering submodels 302, the personalization submodel 306 may output a confidence score indicating whether a user is likely to use a recommendation based on characteristics about the user (e.g., history of using recommendations, demographic information, information about the user's social network such as number of friends, etc.).

The message text submodel 308 is similar to the personalization submodel 306, but is trained on (and processes) the user's message text (e.g., the message the user is currently composing, or the single most-recent message sent or received into the conversation). Thus, the message text submodel 308 can determine if a user is likely to use a recommendation for a given message. For example, the personalization submodel 306 may indicate that the user is amenable to using recommendations in general, but the message text submodel 308 may indicate that the user is unlikely to do so for a given message.

The conversation context submodel 310 is similar to the message text submodel 308, but is trained on (and processes) a larger context of the conversation (e.g., the previous n messages sent or received in a given conversation thread; in one embodiment n=10). Thus, the conversation context submodel 310 determines a confidence that the user will use a recommendation given the recent history of the conversation—for example, a user may be amenable to using recommendations in general (a high confidence from the personalization submodel 306), but might be less likely to use recommended graphical content if graphical content has not been used recently in the conversation; conversely, if other users have been using graphical content recently, the current user might be more likely to do so.

As each of the filtering submodels 302 are run, the recommendation model 300 may generate a confidence score indicating a likelihood that the user will apply a recommendation if one is made. At any stage, if the confidence does not exceed a predefined threshold (which may be the same or different for each submodel), the recommendation model 300 may cease processing and may refrain from loading further submodels into memory. If the filtering submodels 302 collectively indicate that the user is likely to use a recommendation, then processing may proceed to the ranking submodels 304 (e.g., the above-described receiver tag submodel 150 and the send tag submodel 152).

In some embodiments, the submodels may be divided into groups (e.g., filtering submodels 302 and ranking submodules 304, as depicted in FIG. 3A). It is not necessary that all the submodels of a given group be executed before moving to a different group; the submodels may be executed in any order.

The order in which the submodels are loaded into memory and applied may be defined on a personal- or population-level basis. For example, if a model is divided into two submodels (submodel A and submodel B), the submodel that screens out the most options should be run first. If this screening is defined on a user-by-user basis, then the submodel that would screen out the most options for a given user may be applied first. If the screening is defined on a population-level basis, then the submodel that would screen out the most options when applied to the population as a whole may be applied first.

In the conventional scenario, where the submodels are treated as parts of a monolithic model that is loaded into memory all-at-once, the submodels can make use of calculations performed by other submodels and accordingly can have inter-submodel dependencies. In order to allow processing to occur when only a single submodel is loaded into memory at any given time, it may be necessary to rewrite or reconfigure the submodels to break these inter-submodel dependencies. In other words, each submodel should be configured to operate as a standalone unit, without relying on processing steps performed by other submodels.

Figure 3B:
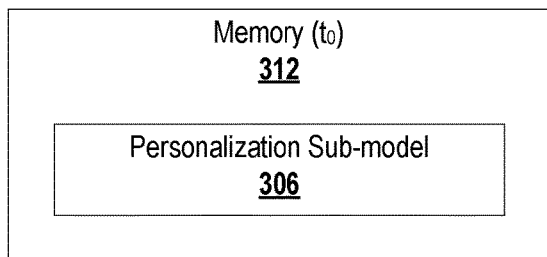
Figure 3C:
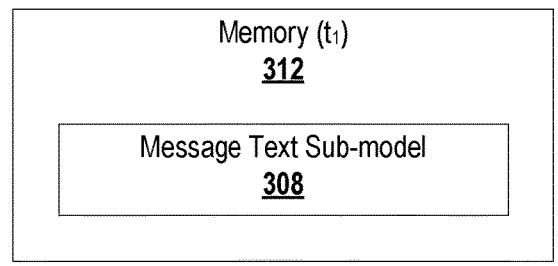
Figure 3D:
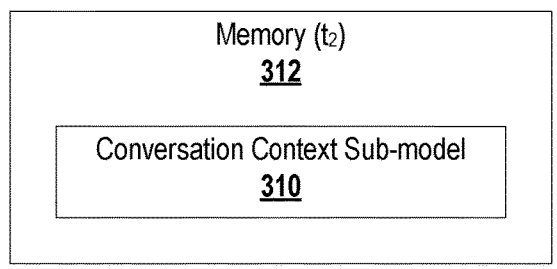

As noted above, each submodel may be loaded into memory on an as-needed basis, and in some embodiments only one (or a limited number, which is smaller than the total number of submodels) are resident in memory at any given time. So, for instance, FIG. 3B depicts a memory 312 at a first time (t0), when the personalization submodel 306 is loaded. After the personalization submodel 306 runs (and outputs a sufficiently high confidence score so that processing proceeds to the next submodel), the personalization submodel 306 may be removed from the memory 312 and the next submodel (in this case, the message text submodel 308) may be loaded into the memory 312 (see FIG. 3C). Similarly, if the message text submodel 308 outputs a sufficiently high confidence score, the message text submodel 308 may be removed from the memory 312 and the conversation context submodel 310 may be loaded into the memory 310 (FIG. 3D).

Model Application

The above-described submodel funnel may optionally be applied as part of natural language processing logic 400 configured to be applied by an on-device model, as shown in FIG. 4. The natural language processing logic 400 is configured to perform several different types of activities (providing recommendations, engaging in a conversation, or performing a natural-language-based task), although other types of activities are also contemplated. As previously noted, the techniques described herein are not necessarily limited to on-device models employing natural language processing, although they may be particularly well suited to these and other machine learning tasks.

The logic 400 may be embodied as computer-executable instructions stored on a non-transitory computer-readable medium. The medium may be resident on an end-user device such as a mobile client, personal computer, or other type of device (especially an endpoint device that engages in end-to-end-encrypted communications with another endpoint device)

At 402, processing may start. Processing may initially be triggered, for instance, when a new message is received or sent in a messaging conversation or thread, when a thread is opened in a communication application interface, when a task completion system receives a new task or updated information about an in-progress task, or in any other scenario where new natural language becomes available.

At block 404, the system may receive an input containing natural language. The input may be in the form of, for example, a single message or group of messages, an instruction to perform a task (which may be received in textual and/or audio form), conversation context information, etc.

At block 406, the system may convert the input into a byte-level embedding. In conventional NLP models, the model represents inputs as word-level embeddings. Given the large vocabulary needed to represent natural language, the embeddings themselves are very large. To accommodate the more limited storage space on a mobile device, exemplary models represent the word embeddings at the byte level, instead of at the word level. Accordingly, for instance, the embedding space can be represented based on byte representations, yielding 256 embeddings (or some other number of bytes, n, yielding 256*2n embeddings) embeddings, rather than the tens-of-thousands to millions of words needed for a vocabulary-based embedding. The input may be broken into groups of n-byte (e.g., n=1) segments, and each segment may be processed by an NLP model that is itself trained and configured to operate in a byte-level embedding space. In addition to decreasing the size of the embedding space, operating on embeddings developed at the byte level has the additional advantage that the model may be better able to handle out-of-vocabulary (OOV) inputs and typographical errors.

As part of this process, the input may be converted into a device-friendly representation. For example, the more limited memory and/or processing capabilities of an end-user device (as compared to a server system) may only support a limited number of operators as stored in an operator library on the mobile device. These operators may not be capable of processing inputs represented as strings (or may not be capable of processing strings efficiently). Accordingly, the input received at block 406 may be represented as another type, such as a sequence of integers, which the mobile device is better capable of processing. The model may be trained and configured to operate on such inputs, rather than strings.

Thus, the input may first be converted from a string to a sequence of integers (or may be initially represented as a sequence of integers), and then the integers may be broken into n-byte (e.g., n=1) segments, which are provided to the model at block 408.

At block 410, the system selects a next submodel to process the input and/or related information, and loads the next submodel into memory. As discussed above, the next submodel to be loaded may be a remaining submodel which is expected to screen out or filter the most available options, or which is the most likely to terminate processing early.

At block 412, the submodel loaded into memory at block 410 may be applied to operate on the input and/or related information. In some embodiments, some submodels making up the model may be configured to output one or more confidence values that are compared to a threshold. The confidence values and thresholds may be used to screen out available options and/or terminate processing by the model early. Accordingly, at block 414, the system determines whether or not to continue (e.g., based on whether the confidence values exceed the threshold). If the determination at block 414 is "no," then processing proceeds to block 416 and terminates.

Otherwise (i.e., the determination at block 414 is "yes," processing proceeds to block 418 and the system determines whether the model includes further submodels that have not yet been processed. The model may define a submodel chain, indicating which submodels should be executed in which order. The order of the submodels may vary from run-to-run, and in some embodiments the next submodel to be run may depend on the output of the previous submodel. For instance, multiple thresholds must be defined such that, if the confidence score output by a first submodel is below a first threshold, processing proceeds to block 416 and terminates. If the confidence score exceeds the first threshold but is less than a second threshold, then a second submodel may be applied. If the confidence score exceeds a third threshold, then a third submodel may be applied. This allows for some contextual processing; for example, the second submodel may be more likely to cause processing to terminate early when the first submodel's output is low, but not sufficiently low to terminate processing immediately, whereas the third submodel may be more likely to cause processing to terminate early when the first submodel's output is high. Otherwise, the submodel that screens out the next-most number of options, or that has the next-highest overall chance of terminating processing early, may be selected.

If the determination at block 418 is "yes" (more submodels remain to be applied), processing may return to block 410 and the next submodel may be loaded into memory. Otherwise, processing may proceed to block 420 and a final output of the model may be generated.

The type and format of the final output of the model may depend on the activity that the model is configured to do. For example, in a recommendation model, the final output of the model may be a list of recommendations, each with an associated confidence score. In a conversational understanding model, the final output of the model may be a list of information that is still needed or a next message in the conversation. In a task model, the final output of the model may be a list of further information that is needed to perform the task, an instruction to a third-party application to perform the task, etc. Other types of models, such as intent classifiers, may also be used but are not shown for the sake of simplicity.

At block 422, the model output may be applied based on the particular application of the model. If the model is a recommendation model, then at block 422-1, the system may select one of the recommendations (e.g., the one with the highest confidence score), and proceed on the basis of that recommendation. If the model is a conversational understanding model, then at block 422-2, the system may update the conversation by sending the new message into the conversation, or generating a message in order to solicit needed information. If the model is a task performance model, then at block 422-3 the system may perform the requested task based on the output of the model.

For a recommendation model, processing may then proceed to block 424, and the recommendation (or recommendations, if more than one recommendation is made) may be displayed on a display of the end-user device, with an option for the user to accept or reject the recommendation. At block 426, the system may receive a selection of the recommendation (or one recommendation from among those displayed), and may incorporate the recommendation into a new or in-progress message. At block 428, the system may transmit the message; in some embodiments, the message may be transmitted as an end-to-end encrypted (E2EE) message in an E2EE communications environment.

Model Training

When a model or submodel is deployed on an end-user device, the model or submodel may not have access to training data conventionally used to train the model. For instance, a natural language processing model might access tens of thousands or millions of natural language training examples in order to properly train the model. The end user device may not have the memory resources to store so many training examples, and may not have the processing resources to train a model based on these training examples in an efficient manner.

Moreover, the local model on the end-user device may need to be smaller, or structured differently, than the server-based model. The local model may use a different configuration (e.g., fewer and/or smaller levels in a neural network, different interconnections between levels, etc.). Thus, it may not be possible to simply copy the weights and parameters of the larger model into the smaller model in order to have the smaller model perform in a similar way.

Accordingly, exemplary embodiments may make use of a training scheme whereby fully-trained models are used as teachers to teach the model (or submodels) deployed on an end-user device to perform particular tasks in a manner that approximates the larger models.

Figure 5A:
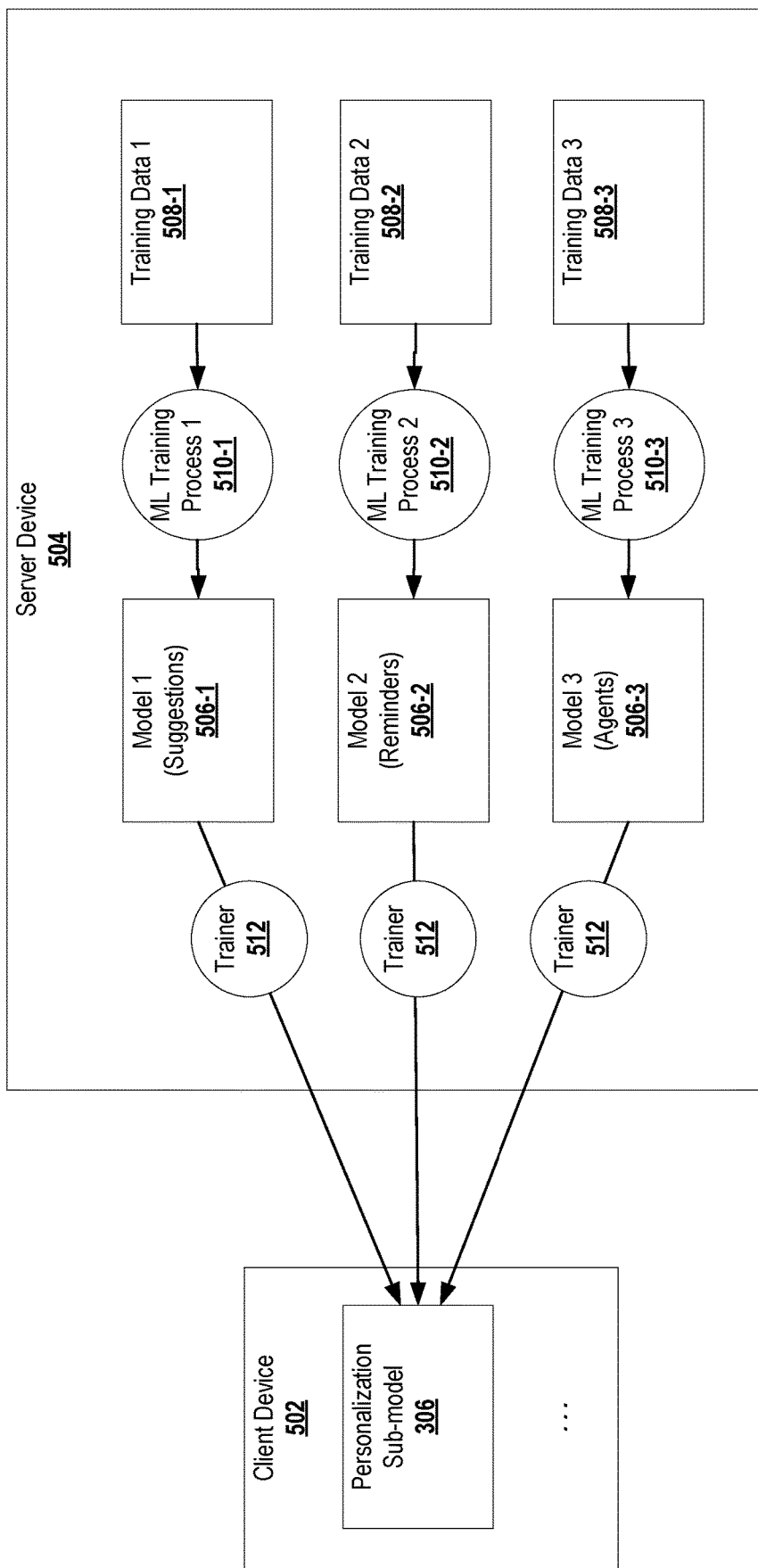
FIG. 5A is a block diagram depicting an exemplary model training environment.

FIG. 5A is a block diagram depicting an exemplary model training environment suitable for use with embodiments described herein. In this environment, a model or submodel (e.g., the personalization submodel 306) is deployed on a client device 502. One or more larger models 506-1, 506-2, 506-3 are trained on a server device 504 in a conventional manner. For example, training data 508-1, 508-2, 508-3 may be gathered; the various sets of training data 508-1, 508-2, 508-3 may be the same, different, or overlapping, depending on whether the respective models 506-1, 506-2, 506-3 are capable of making use of the same or different training data.

One or more machine learning training processes 510-1, 510-2, 510-3 may train respective models 506-1, 506-2, 506-3 using the training data 508-1, 508-2, 508-3. The training processes may be the same or different and may be selected based on the models to be trained and/or the training data used to train the models.

The various models 506-1, 506-2, 506-3 may be used to train the personalization submodel 306. Each model may be associated with a different task, and may train the personalization submodel 306 to perform the task. For instance, in the depicted example the first model 506-1 may train the personalization sub-model to recognize if a given user is likely to use a suggestion or recommendation if one is provided to the user. The second model 506-2 may train the personalization submodel 306 to recognize if a given user is likely to make use of automatically-generated reminders based on the user's calendar, social networking events, messages, or other sources. The third model 506-3 may train the personalization submodel 306 to recognize if a user is likely to make use of a third-party agent or app for performing tasks, if one is offered to the user.

The models 506-1, 506-2, 506-3 may train the personalization submodel 306 using a trainer 512. As described in connections with FIGS. 5B and 5C, the trainer 512 performs a similar process for each of the models 506-1, 506-2, 506-3, regardless of the task that the model **506-*i* is attempting to teach the submodel 306, and therefore the same training 512 can be applied to each model 506-*i* (although this is not required and, in some embodiments, different trainers 512 optimized or calibrated for the respective models 506-*i*** may be applied).

Figure 5B:
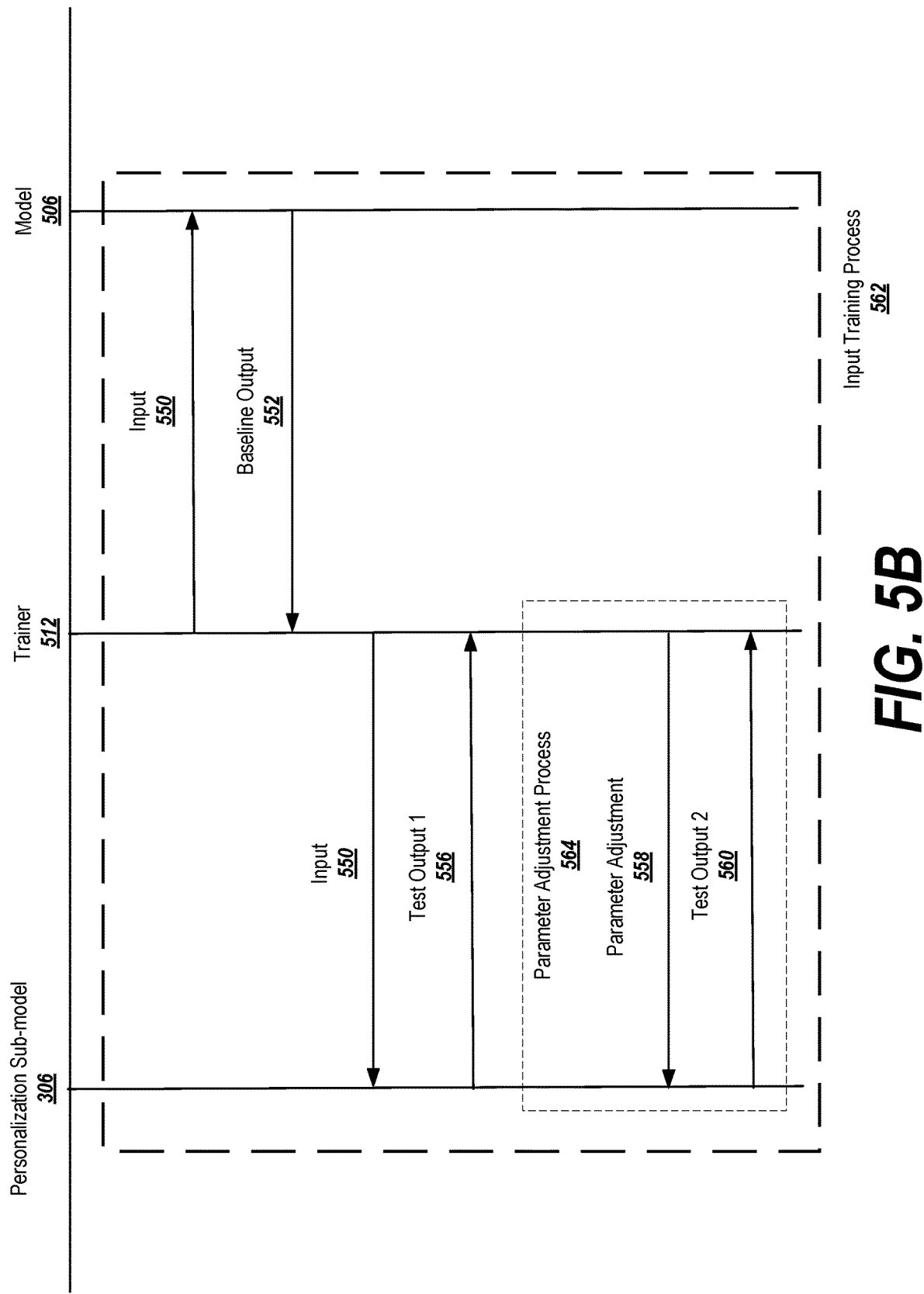
FIG. 5B is a data flow diagram depicting exemplary information exchange in the model training environment of FIG. 5A.

FIG. 5B is a data flow diagram depicting exemplary information exchange in the model training environment of FIG. 5A.

The trainer 512 may generate an input 550, which is provided to a particular model 506 configured to teach the personalization submodel a particular task. The model 506 may have been trained to perform the task by a machine learning process operating on training data. Based on the input 550, the model 506 may generate a baseline output 552 (such as one or more confidence scores as discussed above).

The trainer may then provide the same input 550 to the personalization submodel 306, which may be initialized with initial (e.g., default) weights and parameters. Based on these weights and parameters, the personalization submodel 306 may generate a first test output 556 and provide the first test output 556 to the trainer 512.

The trainer 512 may compare the first test output 556 to the baseline output 552 and determine if, and how, the weights and parameters of the personalization submodel 306 need to be adjusted in order to make the output of the personalization submodel 306 approximate or approach the output of the model 506. The trainer 512 may have access to a training profile or other information that indicates how the weights can be adjusted based on the difference between the test output 556 and the baseline output 552.

For example, in some embodiments a loss function may be defined. The loss function may have a soft target (e.g, the loss between the teacher and the student when the outputs of each are compared, the KL divergence of two probabilities, etc.) and/or a hard target (e.g., a loss between a ground truth, potentially determined by a human administrator, and the student model, irrespective of the output of the teacher model and the student model)

The trainer 512 may generate a parameter adjustment instruction 558 that describes which parameters or weights of the personalization submodel 306 should be adjusted, and by how much (or to which value). The personalization submodel 306 may apply the parameter adjustments described in the instructions 558. After the submodel 306 is adjusted, the submodel 306 may generate a new test output 560 using the same input 550 as was previously provided. The new test output 560 may be provided to the trainer 512, which may iteratively perform further parameter adjustments 558 in a parameter adjustment process 564 in order to make the personalization submodel approximate the output of the model 506. The trainer 512 may learn from previous adjustments, so that over time the trainer 512 learns how the output of the personalization model 306 is affected by changes to particular parameters or weights. Based on this information, the trainer 512 may build the aforementioned training profile.

The parameter adjustment process 564 may terminate for a particular input 550 when the personalization submodel 306 generates a sufficient number of outputs that are within a predetermined threshold value of the baseline outputs 552 generated by the model 506, or when it becomes clear that further adjustments will not improve the output of the personalization submodel 306 (e.g., when the output of the personalization submodel 306 has not improved with respect to the baseline output over a predetermined number of most recent iterations).

After the parameter adjustment process 564 is finished with respect to a particular input 550, a new input 550 may be generated and the process may be started again by generating a new baseline output 552 from the model 506. New inputs may be iteratively generated and tested by repeating these steps in an input training process 562.

FIG. 6 is a flowchart describing exemplary logic for training an on-device model consistent with the information exchange described in FIG. 5B. The logic 600 may be embodied as computer-readable instructions stored on a non-transitory computer readable medium and configured to be executed by one or more hardware processors. In some embodiments, the logic 600 may be executed by a trainer, which may be resident on an end-user device in which a model is being trained, a server on which a teacher model is located, or at a third location remote from the teacher model or the student model.

Processing may start at block 602. The start of processing may be triggered when a student model is initialized on an end-user device, when a teacher model on a server device is initially trained or updated, when a student model requests to be retrained or updated, or under other circumstances as appropriate to the application. The teacher model may be one of multiple models, each model configured to teach a particular task to the student model. The student model may be an entire model, or a submodel or portion of a larger model. In this example, it is assumed that one or more submodels are being trained as student models.

At block 604, the next submodel to be trained at the client-side device may be selected. At block 606, the next teacher model that will be used to train the submodel in a particular task or activity may be selected.

At block 608, an input may be provided to the training model selected at block 606. The input may be a preconstructed input used for training purposes, an input received from an administrator device, a held-back example from the training data used to train the teacher model, or any other suitable input. The input may be configured and formatted to be provided to the teacher model to generate an output, and so may be presented in a format and/or type that is understandable and processable by the teacher model. For example, if the teacher model is configured to read input integers in a bit-level encoding scheme, the input may be converted into (or provided as) a sequence of integers and provided bit-wise into the model.

At block 610, the teacher model may process the input and generate a baseline output. The baseline output may be transmitted to the trainer. The baseline output may be stored for future comparison to an output of the submodel. To that end, at block 612, the input that was provided to the training model in block 608 may also be provided to the submodel, and at block 614 the submodel may generate an output using the provided input and provide the output to the trainer.

At block 616, the trainer may compare the baseline output received at block 610 to the submodel output received at block 614. If the baseline output and submodel output are fairly close (e.g., within a predetermined threshold amount of variation), then the trainer may not need to adjust the submodel and hence no action may be taken (in this case, processing may proceed directly to block 622). Otherwise, the trainer may adjust the parameters of the submodel in an effort to make the submodel perform similarly to the trainer model. The trainer may have an idea of how to adjust the parameters based on the difference between the input and the output; for example, the trainer may consult a profile or relationship that describes which parameters to modify, and how, based on the difference between the baseline output and the submodel output. If no such profile or relationship exists, the trainer may adjust the parameters of the submodel at random. In some embodiments, a profile or relationship may be used but some randomness may be introduced into the parameter adjustments. Consequently, new adjustment strategies may be discovered and used to adjust the profile or relationship.

In some cases, the same input may be provided to different teacher models, which may generate different outputs (either based on the fact that the different teacher models are configured to perform different tasks, or based on the different teacher models having different structures, weights, or parameters). The trainer may recognize the difference in the outputs when the same inputs are applied, and may adjust its training strategy accordingly. For example, the trainer may teach the submodel to behave differently (even in the face of the same input) depending on the task that is being performed. Alternatively or in addition, the trainer may be faced with a choice of how to adjust the parameters or weights of the submodel, and the adjustment that best approximates the combination of outputs from the different teacher models may be selected. Alternatively or additionally, the trainer may accept a certain range of values as outputs of the submodel being trained, based on the acceptable baseline outputs generated from the multiple teacher models.

At block 618, the submodel may be re-run with the new parameters and the previously-used input to determine (at block 620) whether the adjustments have brought the submodel output closer to the baseline output from the teacher model. If not, the previous adjustments may be discarded and processing may return to block 616, where new adjustments may be attempted. The profile or relationship may also be adjusted in recognition of the failure. Blocks 616, 618, and 620 may be repeated until it becomes apparent that further adjustments will not bring the submodel output closer to the baseline (e.g., the adjustments have not significantly decreased the distance between the submodel output and the baseline output for a predetermined number of iterations, or the distance at any given iteration is not decreased by at least a predetermined threshold amount.

If the adjustments were helpful, then the profile or relationship may be adjusted to account for the success, and processing may proceed to block 622. The trainer may determine if more inputs remain to be tested by the training model. If so, processing may return to block 612 and a new input may be provided to the training model to generate a new baseline output. If not, processing may proceed to block 624, where the system determines if more submodels remain to be trained. If so, processing reverts to block 606 and the next training model is selected. In a similar manner, the next submodel to be trained is selected at block 626/604. Once all the suitable training models have been applied to all suitable submodels, processing may proceed to block 628 and terminate.

Social Networking Embodiments

Figure 7:
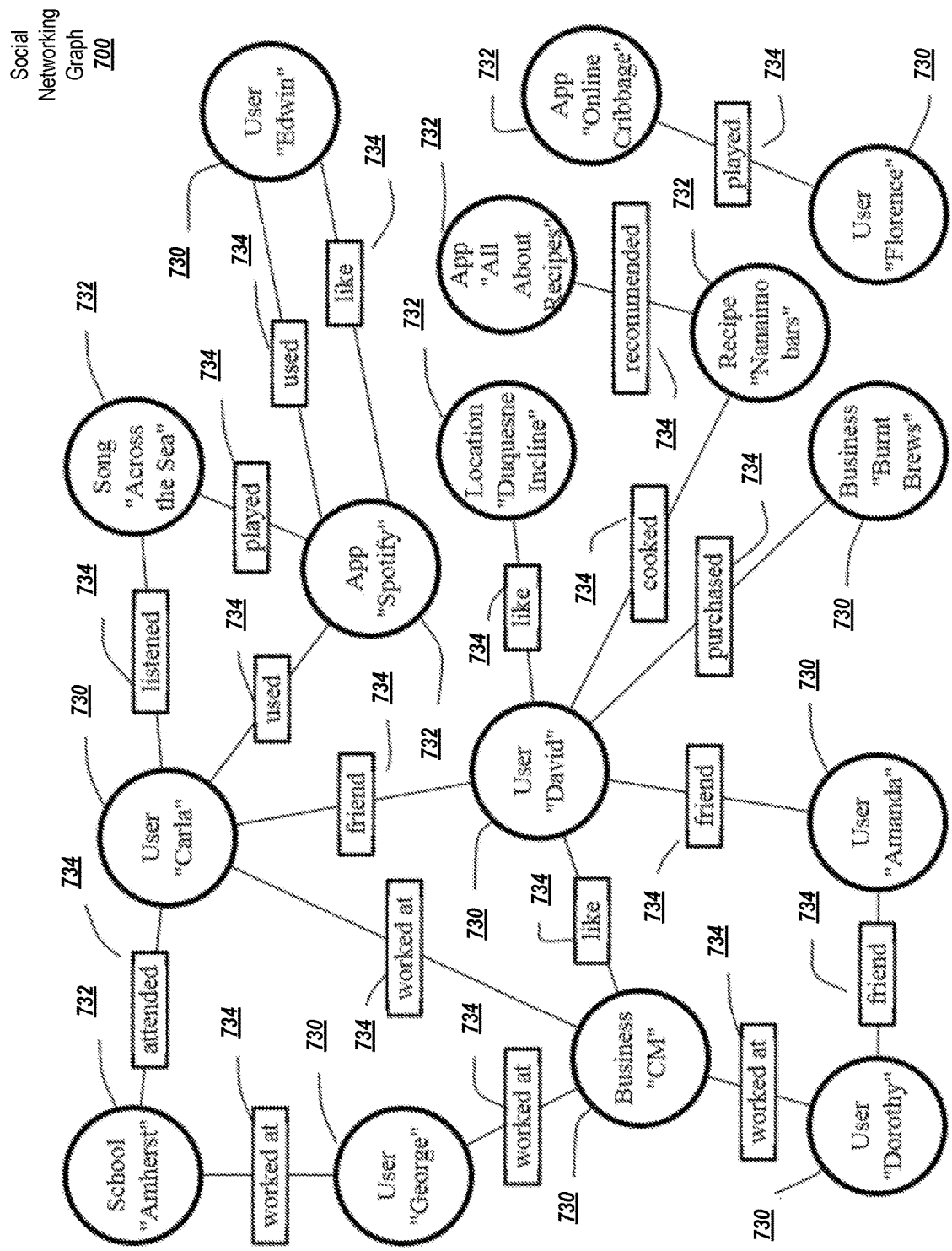
FIG. 7 depicts an exemplary social networking graph.

FIG. 7 illustrates an example of a social graph 700. In exemplary embodiments, a social-networking service may store one or more social graphs 700 in one or more data stores as a social graph data structure via the social networking service.

The social graph 700 may include multiple nodes, such as user nodes 730 and concept nodes 732. The social graph 700 may furthermore include edges 734 connecting the nodes. The nodes and edges of social graph 700 may be stored as data objects, for example, in a data store (such as a social-graph database). Such a data store may include one or more searchable or queryable indexes of nodes or edges of social graph 700.

The social graph 700 may be accessed by a social-networking server, client system, third-party system, or any other approved system or device for suitable applications.

A user node 730 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 730 corresponding to the user, and store the user node 30 in one or more data stores. Users and user nodes 730 described herein may, where appropriate, refer to registered users and user nodes 730 associated with registered users. In addition, or as an alternative, users and user nodes 730 described herein may, where appropriate, refer to users that have not registered with the social-networking system. In particular embodiments, a user node 730 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 730 may be associated with one or more data objects corresponding to information associated with a user. In particular embodiments, a user node 730 may correspond to one or more webpages. A user node 730 may be associated with a unique user identifier for the user in the social-networking system.

In particular embodiments, a concept node 732 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 732 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 732 may be associated with one or more data objects corresponding to information associated with concept node 732. In particular embodiments, a concept node 732 may correspond to one or more webpages.

In particular embodiments, a node in social graph 700 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 732. Profile pages may be viewable by all or a selected subset of other users. As an example and not by way of limitation, a user node 730 may have a corresponding user-profile page in which the corresponding user may add content, make declarations, or otherwise express himself or herself. A business page such as business page 205 may comprise a user-profile page for a commerce entity. As another example and not by way of limitation, a concept node 732 may have a corresponding concept-profile page in which one or more users may add content, make declarations, or express themselves, particularly in relation to the concept corresponding to concept node 732.

In particular embodiments, a concept node 732 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system 140 a message indicating the user's action. In response to the message, the social-networking system 140 may create an edge (e.g., an "eat" edge) between a user node 730 corresponding to the user and a concept node 732 corresponding to the third-party webpage or resource and store edge 734 in one or more data stores.

In particular embodiments, a pair of nodes in social graph 700 may be connected to each other by one or more edges 734. An edge 734 connecting a pair of nodes may represent a relationship between the pair of nodes. In particular embodiments, an edge 734 may include or represent one or more data objects or attributes corresponding to the relationship between a pair of nodes. As an example and not by way of limitation, a first user may indicate that a second user is a "friend" of the first user. In response to this indication, the social-networking system 140 may send a "friend request" to the second user. If the second user confirms the "friend request," the social-networking system may create an edge 734 connecting the first user's user node 730 to the second user's user node 730 in social graph 700 and store edge 734 as social-graph information in one or more data stores. In the example of FIG. 11, social graph 700 includes an edge 734 indicating a friend relation between user nodes 730 of user "Amanda" and user "Dorothy." Although this disclosure describes or illustrates particular edges 734 with particular attributes connecting particular user nodes 730, this disclosure contemplates any suitable edges 734 with any suitable attributes connecting user nodes 730. As an example and not by way of limitation, an edge 734 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 734.

In particular embodiments, an edge 734 between a user node 730 and a concept node 732 may represent a particular action or activity performed by a user associated with user node 730 toward a concept associated with a concept node 732. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 732 may include, for example, a selectable "check in" icon (such as, for example, a clickable "check in" icon) or a selectable "add to favorites" icon. Similarly, after a user clicks these icons, the social-networking system 140 may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system 140 may create a "listened" edge 734 and a "used" edge (as illustrated in FIG. 2) between user nodes 730 corresponding to the user and concept nodes 732 corresponding to the song and application to indicate that the user listened to the song and used the application. Moreover, the social-networking system 140 may create a "played" edge 734 (as illustrated in FIG. 11) between concept nodes 732 corresponding to the song and the application to indicate that the particular song was played by the particular application. In this case, "played" edge 734 corresponds to an action performed by an external application (SPOTIFY) on an external audio file (the song "Across the Sea"). Although this disclosure describes particular edges 734 with particular attributes connecting user nodes 730 and concept nodes 732, this disclosure contemplates any suitable edges 734 with any suitable attributes connecting user nodes 730 and concept nodes 732. Moreover, although this disclosure describes edges between a user node 730 and a concept node 732 representing a single relationship, this disclosure contemplates edges between a user node 730 and a concept node 732 representing one or more relationships. As an example and not by way of limitation, an edge 734 may represent both that a user likes and has used at a particular concept. Alternatively, another edge 734 may represent each type of relationship (or multiples of a single relationship) between a user node 730 and a concept node 732 (as illustrated in FIG. 11 between user node 730 for user "Edwin" and concept node 732 for "SPOTIFY").

In particular embodiments, the social-networking system 140 may create an edge 734 between a user node 730 and a concept node 732 in social graph 700. As an example and not by way of limitation, a user viewing a concept-profile page (such as, for example, by using a web browser or a special-purpose application hosted by the user's client system) may indicate that he or she likes the concept represented by the concept node 732 by clicking or selecting a "Like" icon, which may cause the user's client system to send to the social-networking system a message indicating the user's liking of the concept associated with the concept-profile page. In response to the message, the social-networking system may create an edge 734 between user node 730 associated with the user and concept node 732, as illustrated by "like" edge 734 between the user and concept node 732. In particular embodiments, the social-networking system 140 may store an edge 734 in one or more data stores. In particular embodiments, an edge 734 may be automatically formed by the social-networking system in response to a particular user action. As an example and not by way of limitation, if a first user uploads a picture, watches a movie, or listens to a song, an edge 734 may be formed between user node 730 corresponding to the first user and concept nodes 732 corresponding to those concepts. Although this disclosure describes forming particular edges 734 in particular manners, this disclosure contemplates forming any suitable edges 734 in any suitable manner.

The social graph 700 may further comprise a plurality of product nodes. Product nodes may represent particular products that may be associated with a particular business. A business may provide a product catalog to a consumer-to-business service and the consumer-to-business service may therefore represent each of the products within the product in the social graph 700 with each product being in a distinct product node. A product node may comprise information relating to the product, such as pricing information, descriptive information, manufacturer information, availability information, and other relevant information. For example, each of the items on a menu for a restaurant may be represented within the social graph 700 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 700. The information for a product node may be manipulated by the social-networking system as a product object that encapsulates information regarding the referenced product.

As such, the social graph 700 may be used to infer shared interests, shared experiences, or other shared or common attributes of two or more users of a social-networking system. For instance, two or more users each having an edge to a common business, product, media item, institution, or other entity represented in the social graph 700 may indicate a shared relationship with that entity, which may be used to suggest customization of a use of a social-networking system, including a messaging system, for one or more users.

Computer-Related Embodiments

Figure 8:
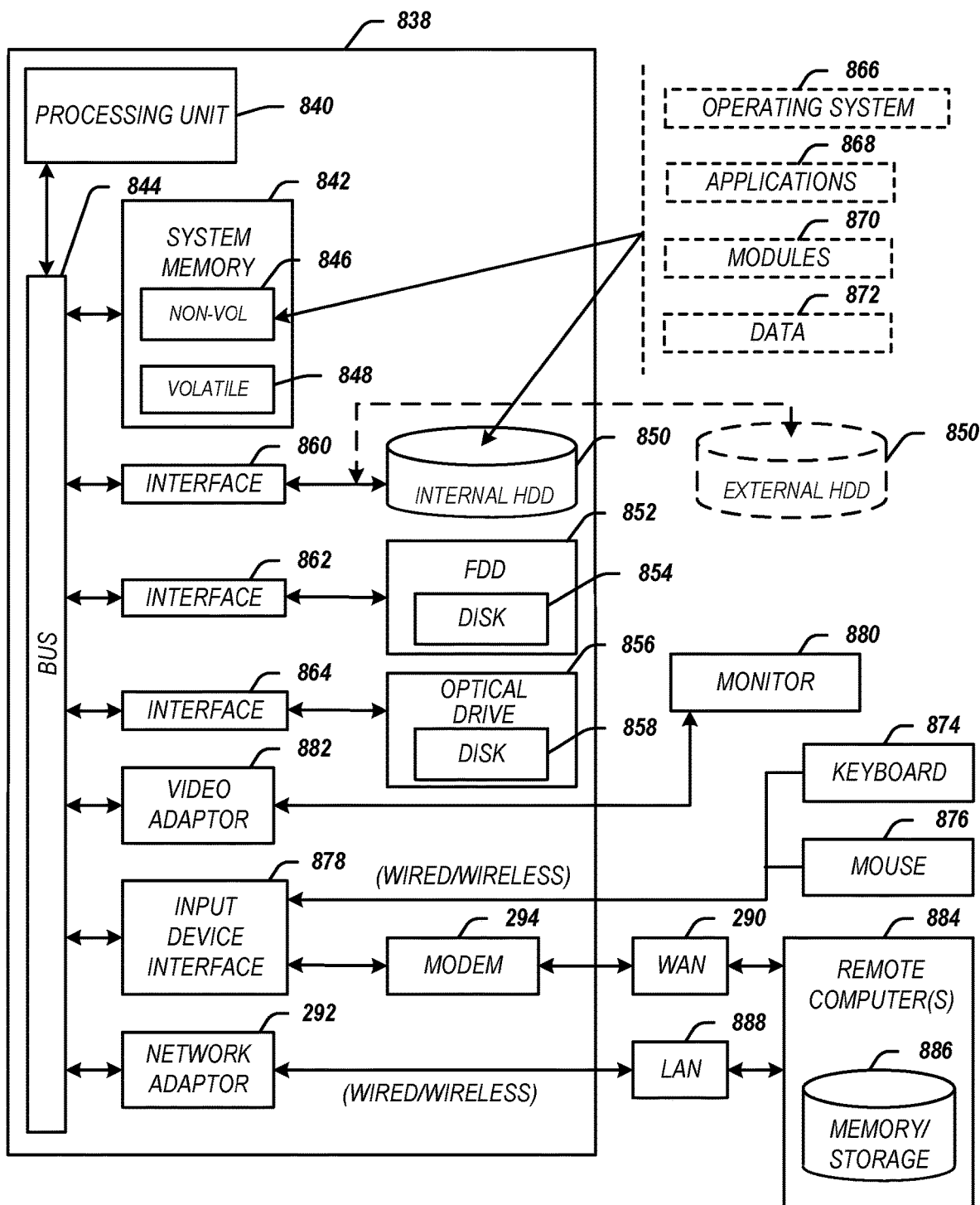
FIG. 8 depicts an exemplary computing device suitable for use with exemplary embodiments.

FIG. 8 illustrates an embodiment of an exemplary computing architecture 800 suitable for implementing various embodiments as previously described. The above-described methods, for example, may be embodied as instructions on a computer readable medium or as part of the computing architecture 800. In one embodiment, the computing architecture 800 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 840, a system memory 842 and a system bus 844. The processing unit 840 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 840.

The system bus 844 provides an interface for system components including, but not limited to, the system memory 842 to the processing unit 840. The system bus 844 can be any of several types of bus structure that may further interconnect to a memory bus (with or without a memory controller), a peripheral bus, and a local bus using any of a variety of commercially available bus architectures. Interface adapters may connect to the system bus 844 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 842 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 842 can include non-volatile memory 846 and/or volatile memory 848. A basic input/output system (BIOS) can be stored in the non-volatile memory 846.

The computer 838 may include various types of computer-readable storage media in the form of one or more lower speed memory units, including an internal (or external) hard disk drive (HDD) 850, a magnetic floppy disk drive (FDD) 852 to read from or write to a removable magnetic disk 854, and an optical disk drive 856 to read from or write to a removable optical disk 858 (e.g., a CD-ROM or DVD). The HDD 850, FDD 852 and optical disk drive 856 can be connected to the system bus 844 by a HDD interface 860, an FDD interface 862 and an optical drive interface 864, respectively. The HDD interface 860 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 846, 848, including an operating system 866, one or more application programs 868, other program modules 870, and program data 872. In one embodiment, the one or more application programs 868, other program modules 870, and program data 872 can include, for example, the various applications and/or components of the system 30.

A user can enter commands and information into the computer 838 through one or more wire/wireless input devices, for example, a keyboard 874 and a pointing device, such as a mouse 876. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 878 that is coupled to the system bus 844, but can be connected by other interfaces such as a parallel port, IEEE 694 serial port, a game port, a USB port, an IR interface, and so forth.

A monitor 880 or other type of display device is also connected to the system bus 844 via an interface, such as a video adaptor 882. The monitor 880 may be internal or external to the computer 838. In addition to the monitor 880, a computer typically includes other peripheral output devices, such as speakers, printers, and so forth.

The computer 838 may operate in a networked environment using logical connections via wire and/or wireless communications to one or more remote computers, such as a remote computer 884. The remote computer 884 can be a workstation, a server computer, a router, a personal computer, portable computer, microprocessor-based entertainment appliance, a peer device or other common network node, and typically includes many or all of the elements described relative to the computer 838, although, for purposes of brevity, only a memory/storage device 886 is illustrated. The logical connections depicted include wire/wireless connectivity to a local area network (LAN) 888 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 838 is connected to the LAN 888 through a wire and/or wireless communication network interface or adaptor 292. The adaptor 292 can facilitate wire and/or wireless communications to the LAN 888, which may also include a wireless access point disposed thereon for communicating with the wireless functionality of the adaptor 292.

When used in a WAN networking environment, the computer 838 can include a modem 294, or is connected to a communications server on the WAN 290, or has other means for establishing communications over the WAN 290, such as by way of the Internet. The modem 294, which can be internal or external and a wire and/or wireless device, connects to the system bus 844 via the input device interface 878. In a networked environment, program modules depicted relative to the computer 838, or portions thereof, can be stored in the remote memory/storage device 886. It will be appreciated that the network connections shown are exemplary and other means of establishing a communications link between the computers can be used.

The computer 838 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:
1. A method comprising:
  receiving an input at a first end-user device, the input comprising natural language from a communication associated with a second end-user device and transmitted over a communications service;
  converting the input into a byte-level embedding;

providing the byte-level embedding to a natural language understanding model located on the first end-user device, the natural language understanding model configured to operate on byte-level embeddings;
generating an output from the natural language understanding model;
selecting a recommendation based on the output;
presenting the recommendation on an interface of the first end-user device;
receiving a selection of the recommendation; and
transmitting a message incorporating the recommendation to the second end-user device.

2. The method of claim 1, wherein the communications service transmits the communication in an end-to-end encrypted environment in which content of the communication is not visible to an intermediate server of the communications service.

3. The method of claim 1, wherein the natural language understanding model makes use of an operator, and further comprising selecting an operator compatible with the first end-user device from an operator library.

4. The method of claim 3, wherein multiple operators are available in the operator library, and the selected operator is selected based on an effect of the selected operator on a latency in generating the output.

5. The method of claim 1, wherein the natural language understanding model is trained on training data represented as integers, and further comprising converting the input to a sequence of integers.

6. The method of claim 1, wherein a size of the input is constrained by a maximum value, the maximum value selected based on an effect of the size of the input on a latency in generating the output.

7. The method of claim 6, wherein the maximum value is 200 characters or less.

8. A non-transitory computer-readable medium storing instructions that, when executed by a processor, cause the processor to:
receive an input at a first end-user device, the input comprising natural language from a communication associated with a second end-user device and transmitted over a communications service;
convert the input into a byte-level embedding;
provide the byte-level embedding to a natural language understanding model located on the first end-user device, the natural language understanding model configured to operate on byte-level embeddings;
generate an output from the natural language understanding model;
select a recommendation based on the output;
present the recommendation on an interface of the first end-user device;
receive a selection of the recommendation; and
transmit a message incorporating the recommendation to the second end-user device.

9. The medium of claim 8, wherein the communications service transmits the communication in an end-to-end encrypted environment in which content of the communication is not visible to an intermediate server of the communications service.

10. The medium of claim 8, wherein the natural language understanding model makes use of an operator, and the instructions, when executed by the processor, cause the processor to select an operator compatible with the first end-user device from an operator library.

11. The medium of claim 10, wherein multiple operators are available in the operator library, and the selected operator is selected based on an effect of the selected operator on a latency in generating the output.

12. The medium of claim 8, wherein the natural language understanding model is trained on training data represented as integers, and the instructions, when executed by the processor, cause the processor to convert the input to a sequence of integers.

13. The medium of claim 8, wherein a size of the input is constrained by a maximum value, the maximum value selected based on an effect of the size of the input on a latency in generating the output.

14. The medium of claim 13, wherein the maximum value is 200 characters or less.

15. An end-user device comprising:
a hardware interface configured to receive an input at a first end-user device, the input comprising natural language from a communication associated with a second end-user device and transmitted over a communications service;
a non-transitory device-readable medium configured to store a natural language understanding model;
a hardware processor configured to:
convert the input into a byte-level embedding;
provide the byte-level embedding to the natural language understanding model, the natural language understanding model configured to operate on byte-level embeddings;
generate an output from the natural language understanding model; and
select a recommendation based on the output;
a display configured to present the recommendation on an interface, wherein the processor is further configured to receive a selection of the recommendation;
a network transmitter configured to transmit a message incorporating the recommendation to the second end-user device.

16. The device of claim 15, wherein the communications service transmits the communication in an end-to-end encrypted environment in which content of the communication is not visible to an intermediate server of the communications service.

17. The device of claim 15, wherein the natural language understanding model makes use of an operator, and the hardware processor is configured to select an operator compatible with the first end-user device from an operator library.

18. The device of claim 17, wherein multiple operators are available in the operator library, and the selected operator is selected based on an effect of the selected operator on a latency in generating the output.

19. The device of claim 15, wherein the natural language understanding model is trained on training data represented as integers, and the hardware processor is configured to convert the input to a sequence of integers.

20. The device of claim 15, wherein a size of the input is constrained by a maximum value, the maximum value selected based on an effect of the size of the input on a latency in generating the output.

* * * * *